(12) United States Patent
Tanaka et al.

(10) Patent No.: US 7,123,126 B2
(45) Date of Patent: *Oct. 17, 2006

(54) METHOD OF AND COMPUTER PROGRAM PRODUCT FOR MONITORING PERSON'S MOVEMENTS

(75) Inventors: Toshiaki Tanaka, Tokyo (JP); Takeichiro Nishikawa, Kanagawa (JP); Naoki Imasaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 522 days.

This patent is subject to a terminal disclaimer.

(21) Appl. No.: 10/395,344

(22) Filed: Mar. 25, 2003

(65) Prior Publication Data
US 2003/0197612 A1   Oct. 23, 2003

(30) Foreign Application Priority Data
Mar. 26, 2002  (JP)  ............................ 2002-086782
Mar. 28, 2002  (JP)  ............................ 2002-092485

(51) Int. Cl.
G05B 19/00   (2006.01)

(52) U.S. Cl. .............. 340/5.2; 340/539.11; 340/539.13; 340/572.1; 340/573.4

(58) Field of Classification Search ...................... None
See application file for complete search history.

(56) References Cited

U.S. PATENT DOCUMENTS

| | | | | |
|---|---|---|---|---|
| 4,945,367 A | * | 7/1990 | Blackshear | .................. 396/427 |
| 5,541,585 A | * | 7/1996 | Duhame et al. | ........... 340/5.62 |
| 5,886,634 A | * | 3/1999 | Muhme | .................. 340/572.1 |
| 6,057,764 A | * | 5/2000 | Williams | .................. 340/572.1 |
| 6,111,517 A | * | 8/2000 | Atick et al. | ................. 340/5.83 |
| 6,232,877 B1 | * | 5/2001 | Ashwin | .................... 340/572.1 |
| 6,335,688 B1 | * | 1/2002 | Sweatte | .................... 340/573.1 |
| 6,437,696 B1 | * | 8/2002 | Lemelson et al. | ........ 340/573.4 |
| 6,522,253 B1 | * | 2/2003 | Saltus | ........................ 340/571 |
| 6,757,368 B1 | * | 6/2004 | Binder | .................... 379/90.01 |
| 6,873,260 B1 | * | 3/2005 | Lancos et al. | ........... 340/573.1 |
| 6,965,294 B1 | * | 11/2005 | Elliott et al. | ................. 340/5.2 |

FOREIGN PATENT DOCUMENTS

| | | |
|---|---|---|
| JP | 8-163652 | 6/1996 |
| JP | 9-46694 | 2/1997 |
| JP | 2605014 | 4/1997 |
| JP | 9-130781 | 5/1997 |
| JP | 2901586 | 6/1999 |
| JP | 11-202929 | 7/1999 |
| JP | 11-296761 | 10/1999 |
| JP | 2001-118177 | 4/2001 |

\* cited by examiner

*Primary Examiner*—Benjamin C. Lee
*Assistant Examiner*—Son Tang
(74) *Attorney, Agent, or Firm*—Oblon, Spivak, McClelland, Maier & Neustadt, P.C.

(57) ABSTRACT

A monitoring method includes acquiring tag identification information unique to a radio frequency identification tag carried by a person, and reader identification information about a tag reader that detects the radio frequency identification tag. Next, attribute information about the person is acquired based on the tag identification information, and area information about a detection area of the tag reader is acquired based on the reader identification information. Finally, it is determined whether the person carrying the radio frequency identification tag having the attribute information acquired is allowed to enter into the detection area based on the area information.

20 Claims, 18 Drawing Sheets

FIG.5

TAG IDENTIFICATION INFORMATION TABLE

| TAG LABEL | TAG IDENTIFICATION INFORMATION |
|---|---|
| #010011 | $TID_1$ |
| #010012 | $TID_2$ |
| #010013 | $TID_3$ |
| #010014 | $TID_4$ |
| ⋮ | ⋮ |

FIG.6

READER TABLE

| READER IDENTIFICATION INFORMATION | PLACE CODE | NAME | ZONE |
|---|---|---|---|
| $RID_1$ | $ZID_1$ | E1-A-1 | EAST HALL |
| $RID_2$ | $ZID_2$ | E1-A-2 | EAST HALL |
| $RID_3$ | $ZID_3$ | E1-A-3 | EAST HALL |
| $RID_4$ | $ZID_4$ | W1-B-2 | WEST HALL |
| ⋮ | ⋮ | ⋮ | ⋮ |

FIG.7

PERSON TABLE

| PERSON IDENTIFICATION INFORMATION | NAME | AGE | DESTINATION | ATTRIBUTE INFORMATION |
|---|---|---|---|---|
| $PID_1$ | MANAGER-A | 40 | - - - | $AID_1$ |
| $PID_2$ | EMPLOYEE-B | 23 | - - - | $AID_1$ |
| $PID_3$ | PART-TIMER-C | 18 | - - - | $AID_2$ |
| ⋮ | ⋮ | ⋮ | ⋮ | ⋮ |
| $PID_{101}$ | GUEST-A | - - - | $ZID_{10}$ | $AID_3$ |
| ⋮ | ⋮ | ⋮ | ⋮ | ⋮ |

FIG.8

ATTRIBUTE TABLE

| PLACE CODE | ATTRIBUTE -1 ($AID_1$) | ATTRIBUTE-2 ($AID_2$) | ATTRIBUTE-3 ($AID_3$) |
|---|---|---|---|
| $ZID_1$ | 1 | 1 | 2 |
| $ZID_2$ | 1 | 1 | 2 |
| $ZID_3$ | 1 | 2 | 2 |
| ⋮ | ⋮ | ⋮ | ⋮ |

1:ENTRY PERMITTED   2:ENTRY PROHIBITED

FIG.9

TAG-PERSON RELATION TABLE

| TAG IDENTIFICATION INFORMATION | PERSON IDENTIFICATION INFORMATION |
|---|---|
| $TID_1$ | $PID_1$ |
| $TID_2$ | $PID_2$ |
| $TID_3$ | $PID_3$ |
| $TID_4$ | $PID_4$ |
| ⋮ | ⋮ |

FIG.10

CAMERA TABLE

| CAMERA IDENTIFICATION INFORMATION | PLACE CODE |
|---|---|
| $CID_1$ | $ZID_1$ |
| $CID_2$ | $ZID_2$ |
| $CID_3$ | $ZID_3$ |
| $CID_4$ | $ZID_4$ |
| ⋮ | ⋮ |

FIG.11

DOOR TABLE

| DOOR IDENTIFICATION INFORMATION | PLACE CODE |
|---|---|
| $DID_1$ | $ZID_0$ |
| $DID_2$ | $ZID_6$ |
| $DID_3$ | $ZID_7$ |
| $DID_4$ | $ZID_8$ |
| ⋮ | ⋮ |

FIG.12

TRACK TABLE

TID$_2$ : 9 OCT 2002

TID$_8$ : 9 OCT 2002

TID$_5$ : 9 OCT 2002

| PLACE CODE | ENTRY TIME ($t_0$) | EXIT TIME ($t_1$) | STAY PERIOD (s) |
|---|---|---|---|
| ZID$_{10}$ | 101109 | 101159 | 50 |
| ZID$_{11}$ | 101158 | 101320 | 82 |
| ZID$_{16}$ | 101318 | 105848 | 2730 |
| ZID$_{11}$ | 105847 | 105928 | 41 |
| ZID$_{12}$ | 105925 | 105958 | 33 |
| ZID$_{13}$ | 105957 | 110108 | 71 |
| ZID$_{14}$ | 110109 | 110118 | 9 |
| ZID$_{19}$ | 110116 | | |

FIG.16

PERSON RECOGNITION TABLE

| IDENTIFICATION NUMBER \ TIME | t0 | t1 | t2 | ... |
|---|---|---|---|---|
| 101 | $ZID_2$ | $ZID_3$ | $ZID_3$ | ... |
| 102 | $ZID_2$ | $ZID_2$ | $ZID_2$ | ... |
| ⋮ | ⋮ | ⋮ | ⋮ | ... |

AAAA···ABB···BCCCCCB
⎵⎵⎵⎵  ⎵⎵⎵
30        10
CHARACTERS  CHARACTERS

| READER IDENTIFICATION INFORMATION | TAG IDENTIFICATION INFORMATION | TAG IDENTIFICATION INFORMATION | TAG IDENTIFICATION INFORMATION | SENSOR OUTPUT |
|---|---|---|---|---|
| $RID_4$ | $TID_2$ | $TID_5$ | ... | 1 |

METHOD OF AND COMPUTER PROGRAM PRODUCT FOR MONITORING PERSON'S MOVEMENTS

CROSS-REFERENCE TO RELATED APPLICATIONS

This application is based upon and claims the benefit of priority from the prior Japanese Patent Applications No. 2002-086782 filed on Mar. 26, 2002 and No. 2002-092485 filed on Mar. 28, 2002; the entire contents of which are incorporated herein by reference.

BACKGROUND OF THE INVENTION

1) Field of the Invention

The present invention relates to a monitoring method of detecting, for example, entry of a person into a prohibited area, which is a part of a relatively closed area, such as a building or an airport, based on the person's personal information or behavior (hereinafter, "movement").

2) Description of the Related Art

Conventionally a visual monitoring system is known in which a surveillance camera, the direction and the zoom of which can be remotely controlled as desired, is arranged in a specified area. Persons entering into the specified area are monitored visually from a remote place based on the images or video taken by the camera.

In this visual monitoring system, a judgment whether the person monitored by the surveillance camera is suspicious or not, is made based upon visual observation. However, the judgment becomes difficult when a lot of cameras are set because the area to be monitored is big, or the number of persons to be monitored is large.

Moreover, a wide area monitoring system has been disclosed in Japanese Patent Application Laid-Open No. 9-130781. In this wide area monitoring system, a person is identified at an entrance of, for example, a building, based on a wireless card carried by that person, and a person decided as suspicious is tracked with a surveillance camera.

In this wide area monitoring system also the suspicious person is tracked using the video taken by the surveillance camera. However, the tracking becomes difficult when there are a lot of persons around the suspicious person.

Furthermore, a monitoring system has been disclosed in Japanese Patent Application Laid-Open No. 8-163652. In this monitoring system, a portable terminal is handed over to a person entering into, for example, a building. This portable terminal is capable of determining its own position and transmitting a signal that indicates the position. In addition, a surveillance camera monitors an area of the building that is prohibited. Whether a person has entered the prohibited area is decided based on the signal from the portable terminal carried by that person, and the entry of the person into the prohibited area is re-confirmed through the images or the video taken by the surveillance camera. The portable terminal operates based on, for instance, the Global Positioning Satellite (GPS) system or the Personal Handyphone System (PHS).

In this monitoring system, position of the portable terminal is determined using the GPS or the PHS. However, the resolution of position measurement using the GPS or the PHS is low in view of the fact that the object of monitoring are, rooms or halls in a building, small. Therefore, the precision of the monitoring is low.

Moreover, a card monitoring system and a password monitoring system are know in which a person inserts a magnetic card or enters a password in a device provided at the entrance of, for example, a building. The person is allowed to enter into the building only if the magnetic card or password is authentic. In these card monitoring system and password monitoring system, there is a door, which is generally locked, at the entrance of the area and the area is enclosed with walls from all the sides. The door is opened only when the person has an authentic magnetic card or an authentic password. Thus, anyone without an authentic magnetic card or a password can not enter the area.

Furthermore, a transponder card monitoring system has been disclosed in Japanese Patent No. 2605014. In this transponder card monitoring system, a person entering into, for example, a building, carries a transponder card that outputs a signal, and a device that receives the signal is arranged near the entrance of the building. This device receives the signal form the transponder card carried by the persons entering into the building and decides whether a person is to be allowed to enter the building based on the signal.

In the card monitoring system, the password monitoring system, and the transponder card monitoring system, whether the person is allowed to enter is decided at the entrance. However, the person is not monitored once he passes through the entrance. Furthermore, the prohibited area needs to be enclosed with walls from all sides, and a lot of doors with lock mechanism are required to allow different entry permission depending on the person. Therefore, in these systems, since the walls and the locks, the magnetic cards or the transponder cards or the devices for entering passwords are required, there is a problem that the system becomes costly. Moreover, the person can not be monitored once he passes through the door. In addition, a person may pass through the door that was opened for some reason, say for some other person. Furthermore, since checking whether the cards or the passwords are authentic and opening the door when the cards or the passwords are authentic requires time and people have to wait till the door opens even if they are authorized to enter.

Moreover, a radio terminal alarm system has been disclosed in Japanese Patent No. 2901586. In this radio terminal alarm system, a radio terminal carried by a person receives a radio signal from a radio station. The radio signal indicates whether the radio terminal, that is, the person carrying the radio terminal, is allowed to enter in an area where it is trying to enter. If the person is trying to enter into a prohibited area, the radio station sends a signal to the radio terminal so as to output an alarm. Thus, a person carrying the radio terminal comes to know that the area is the prohibited area. In addition, when persons around the person hear the alarm, they come to know that the person is not allowed to enter the prohibited area and thus the alarm serves as a warning to the surrounding persons.

In this radio terminal alarm system, an alarm is generated when a person tries to enter the prohibited area. However, it is easy to stop the alarm and enter the prohibited area. Furthermore, it is impossible to flexibly change authority for entry into the prohibited area based on entry history and to control the authority of the person who has acted illegally in the past. Moreover, there is a problem that the warning is not correctly done if the radio terminal is damaged intentionally or non-intentionally or thrown away.

Moreover, in all the conventional systems described above, it can not be decided whether a person is a suspicious person and then automatically control a surveillance camera so as to monitor the suspicious person or to decide whether a person has entered an area in which he is not supposed to and show him a route which he should follow.

A system is know that employs a radio frequency identification (hereinafter, "RFID") tag to monitor movements of a person. However, there is no prior art that employs the RFID tag to a security system.

SUMMARY OF THE INVENTION

It is an object of the present invention to provide a method and a computer program product capable of easily monitoring movement of a person.

The monitoring method according to embodiments of the present invention comprises acquiring tag identification information that is unique to a radio frequency identification tag carried by a person, and reader identification information that is unique to a tag reader capable of detecting the radio frequency identification tag in a predetermined area; acquiring attribute information that is information about the person carrying the radio frequency identification tag based on the tag identification information acquired; acquiring area information that is information about the predetermined area based on the reader identification information; and determining whether the person carrying the radio frequency identification tag is allowed to enter the predetermined area based on the attribute information and the area information.

The monitoring method according to embodiments of the present invention comprises acquiring tag identification information that is unique to a radio frequency identification tag carried by a person, and reader identification information that is unique to a tag reader capable of detecting the radio frequency identification tag in a predetermined area; recording positional history that indicates a position of the radio frequency identification tag at a certain time based on timing at which the tag identification information and the reader identification information are acquired; recording a video of the predetermined area and time at which the video is recorded; calculating the number of tag identification information detected by a predetermined tag reader based on the positional history; calculating the number of persons in the predetermined area based on the video; and determining whether the number of the tag identification information is equal to the number of persons.

The monitoring method according to embodiments of the present invention comprises acquiring tag identification information that is unique to a radio frequency identification tag carried by a person, and reader identification information that is unique to a tag reader capable of detecting the radio frequency identification tag in a predetermined area; recording positional history that indicates position of the radio frequency identification tag at a certain time based on timing at which the tag identification information and the reader identification information are acquired; detecting with a human detector whether a person is present in a predetermined area corresponding to a predetermined tag reader; acquiring the tag identification information detected by the predetermined tag reader based on the positional history; and determining whether the detection by the human detector and the tag identification information satisfy a predetermined relationship.

The monitoring method according to embodiments of the present invention comprises acquiring tag identification information that is unique to a radio frequency identification tag carried by a person, and reader identification information that is unique to a tag reader capable of detecting the radio frequency identification tag in a predetermined area; recording positional history that indicates a position of the radio frequency identification tag at a certain time based on timing at which the tag identification information and the reader identification information are acquired; preparing a pattern of the positional history for each of the tag identification information based on the positional history; and determining whether at least a portion of the prepared pattern matches with any one of already recorded patterns.

The computer program product according to embodiments of the present invention realizes the monitoring method according to embodiments of the present invention on a computer.

BRIEF DESCRIPTION OF THE DRAWINGS

FIG. 5.shows the contents of a tag identification information table;

FIG. 6 shows the contents of a reader table;

FIG. 7 shows the contents of a person table;

FIG. 8 shows the contents of an attribute table;

FIG. 9 shows the contents of a tag-person table;

FIG. 10 shows the contents of a camera table;

FIG. 11 shows the contents of a door table;

FIG. 12 shows the contents of a track table;

FIG. 16 shows the contents of a person recognition table;

DETAILED DESCRIPTION

Exemplary embodiments of the method and the computer program product relating to the present invention will be explained in detail below with reference to the accompanying drawings.

Figure 1:
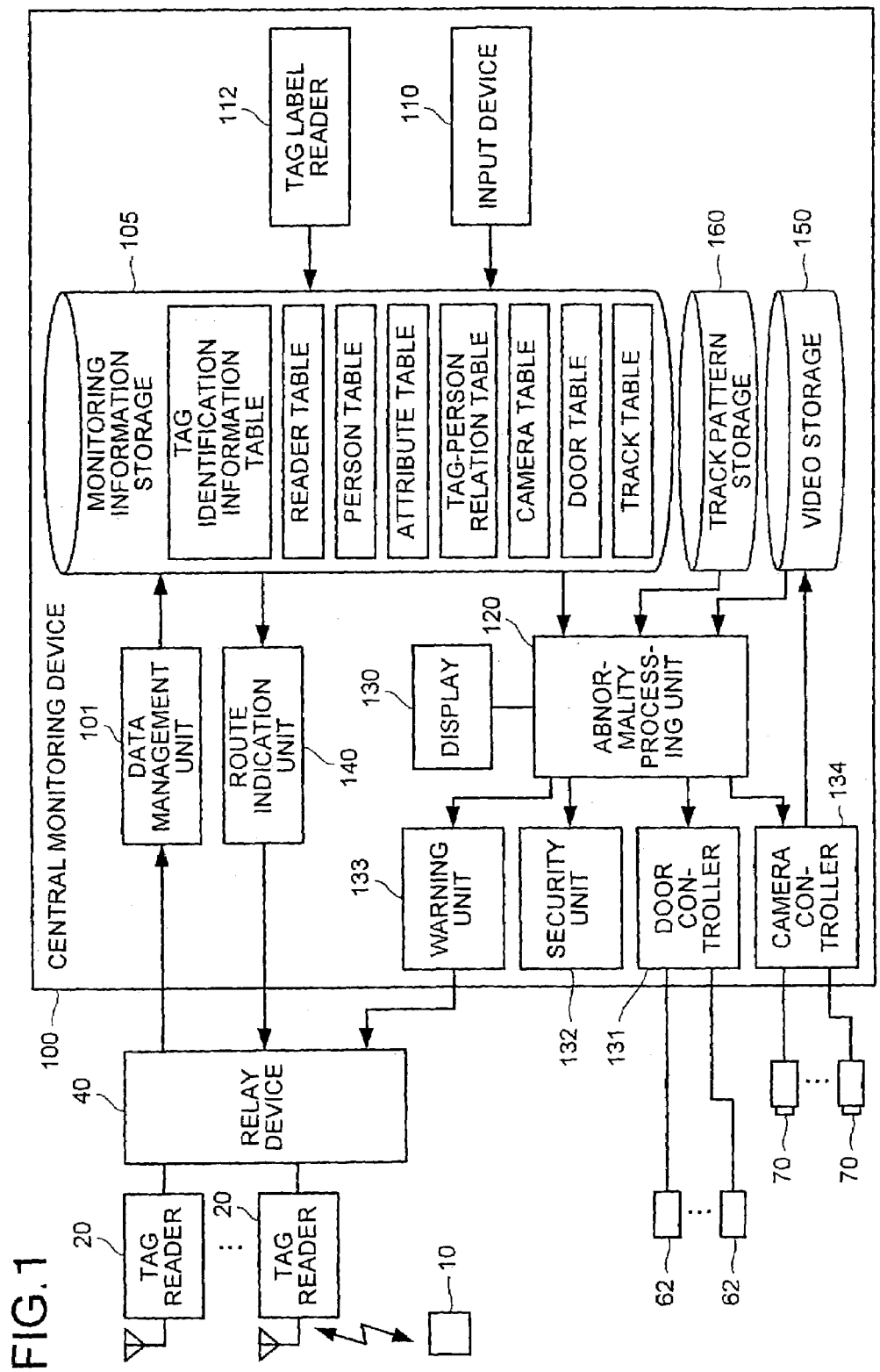
FIG. 1 schematically shows a configuration of the monitoring system according to one embodiment of the present invention.

FIG. 1 schematically shows a configuration of the monitoring system according to one embodiment of the present invention. The monitoring system shown in FIG. 1 is comprised of at least one RFID tag 10, a plurality of tag readers 20, a relay device 40, a central monitoring device 100, a plurality of door lock mechanisms 62, and a plurality of surveillance cameras 70.

Figure 2:
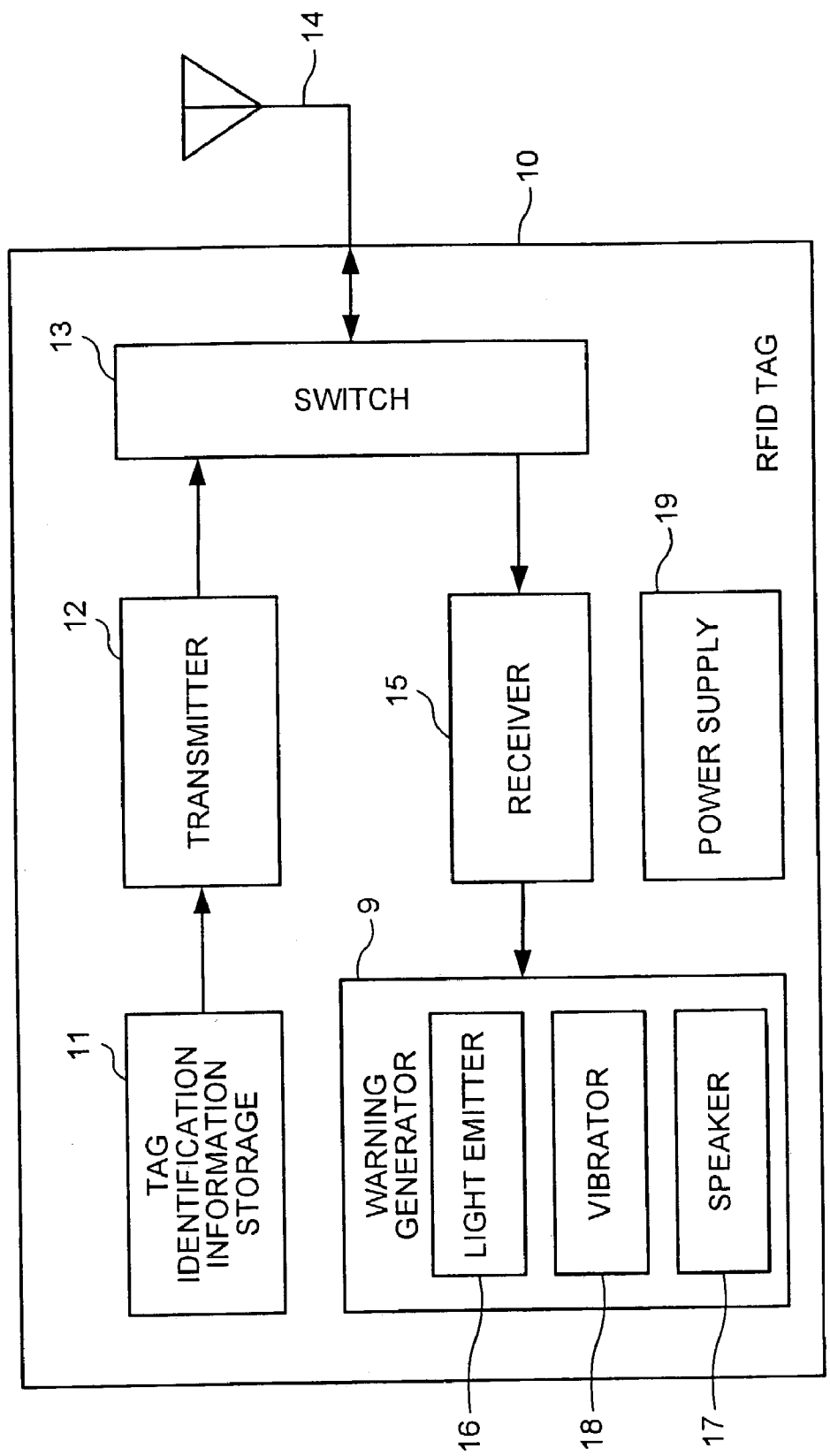
FIG. 2 schematically shows a configuration of the RFID tag.

One RFID tag 10 is carried by a person who enters a predetermined surveillance area. FIG. 2 schematically shows a configuration of the RFID tag 10. The RFID tag 10 is comprised of a tag identification information storage 11, a transmitter 12, a switch 13, an antenna 14, a receiver 15, a warning generator 9, and a power supply 19. The tag identification information storage 11 stores tag identification information that is unique to the RFID tag 10. The transmitter 12 generates and transmits a signal that includes the tag identification information. The receiver 15 receives, via the switch 13 and the antenna 14, the signal transmitted by the tag reader 20 and analyzes the signal. The switch 13 switches between transmission and reception of the signal via the antenna 14. The switch is comprised of, for example, a directional coupler.

The warning generator 9 is comprised of a light emitter 16, a speaker 17, and a vibrator 18. The light emitter 16 is, for example, a light emission diode (LED), and emits, for example, red, yellow, blue, or green light. The speaker 17 outputs an alarm or a warning sound. The vibrator 18 vibrates the RFID tag 10 and it is comprised of, for example, an eccentric rotor that is employed in the mobile phones.

The RFID tag 10 transmits a signal to the tag reader 20. Precisely, the signal generated by the transmitter 12 is transmitted to the tag reader 20 via the switch 13 and the antenna 14. The transmission of the signal is performed at a certain timing which will be described in detail later. A tag label, which is unique, is affixed on a surface of each of the RFID tag 10. The tag label includes optical-readable characters, a barcode or the like.

One tag reader 20 is arranged in each of a plurality of the predetermined surveillance areas. The tag reader 20 receives a signal from the RFID tag 10 carried by a person entering into the surveillance area corresponding to the tag reader 20, extracts the tag identification information from the signal, and transmits the tag identification information to the relay device 40.

Moreover, the tag reader 20 receives an instruction signal, that is to be transmitted to a particular RFID tag 10, from the relay device 40. The instruction signal includes various instructions. The tag reader 20 appends tag identification information corresponding to the particular RFID tag 10 to the instruction signal and transmits the instruction signal to the particular RFID tag 10 as a radio frequency signal. Each tag reader 20 is assigned with a unique reader identification information.

A lock mechanism 62 is provided for a door corresponding to each one of the surveillance area. The lock mechanism 62 locks or unlocks (in other words, opens or closes) the door according to a lock control signal received from the central monitoring device 100. The lock mechanisms 62 are assigned with door identification information $DID_1$, $DID_2$, $DID_3$, . . . , respectively.

One surveillance camera 70 is arranged in each of the surveillance areas. The surveillance camera 70 records a video of the corresponding surveillance area. The surveillance camera 70 transmits the video to the central monitoring device 100. A direction and zoom of the surveillance camera 70 can controlled according to a camera control signal generated by the central monitoring device 100. Further, the surveillance cameras 70 are assigned with camera identification information $CID_1$, $CID_2$, $CID_3$, . . . , respectively.

Figure 3:
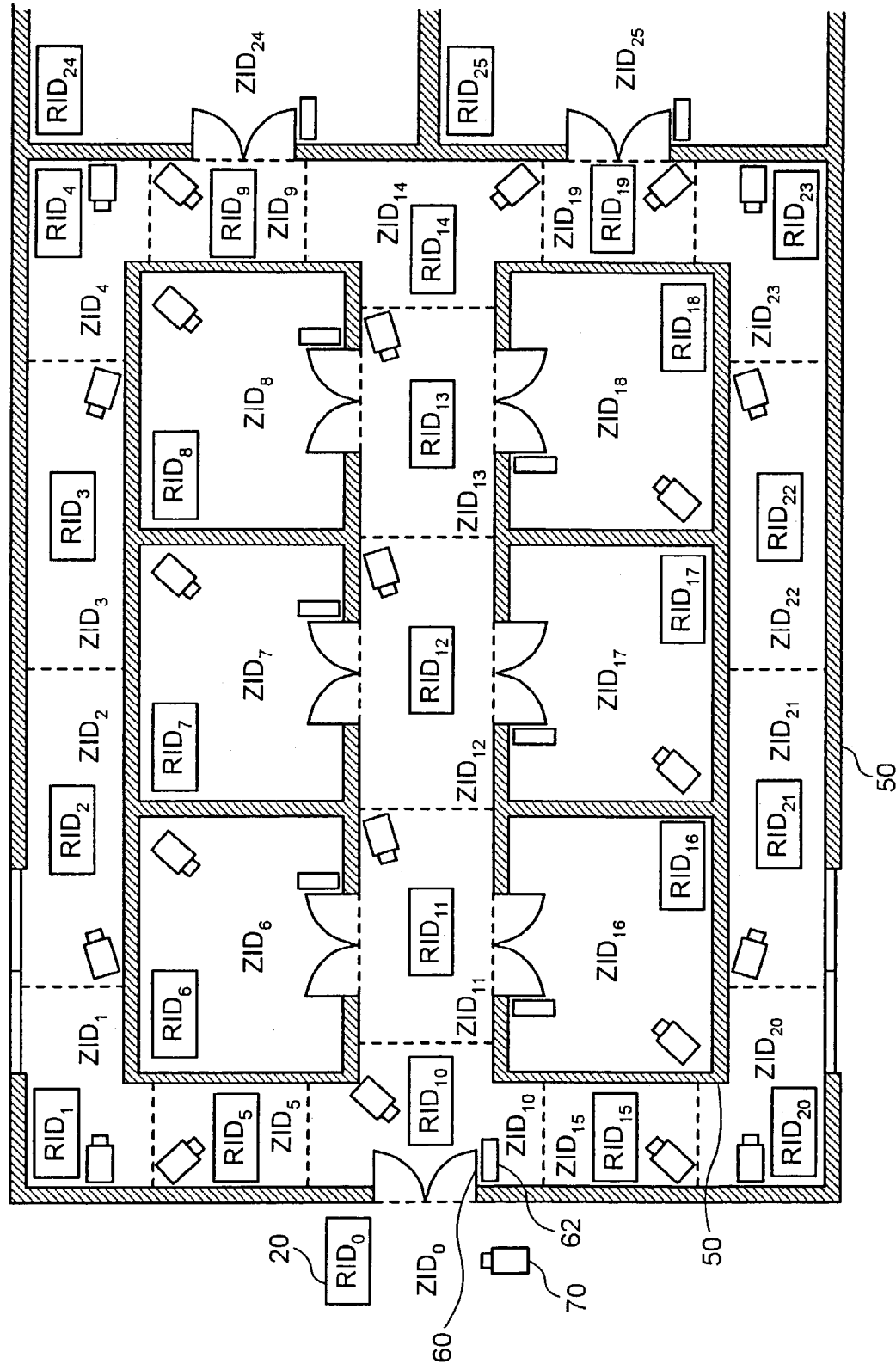
FIG. 3 shows one example of arrangement of tag readers, lock mechanisms, and surveillance cameras.

FIG. 3 shows one example of arrangement of the tag readers 20, the lock mechanisms 62, and the surveillance cameras 70. The surveillance areas are assigned with place code $ZID_1$, $ZID_2$, $ZID_3$, . . . , respectively. One tag reader 20 and one surveillance camera 70 are arranged in each surveillance area. The tag readers 20 are assigned with reader identification information $RID_1$, $RID_2$, $RID_3$, . . . , respectively.

Sensitivity of receiving (hereinafter, "receiving sensitivity") a signal from the RFID tag 10 of each tag reader 20 is adjusted so that the tag reader 20 detect only the RFID tag 10 in the surveillance area corresponding to that tag reader 20. In other words, the tag reader 20 can detect the RFID tag 10 only in the corresponding the surveillance area. However, the area in which a tag reader can detect a RFID tag (hereinafter, "detection range") is circular with the tag reader at its center.

Figure 4:
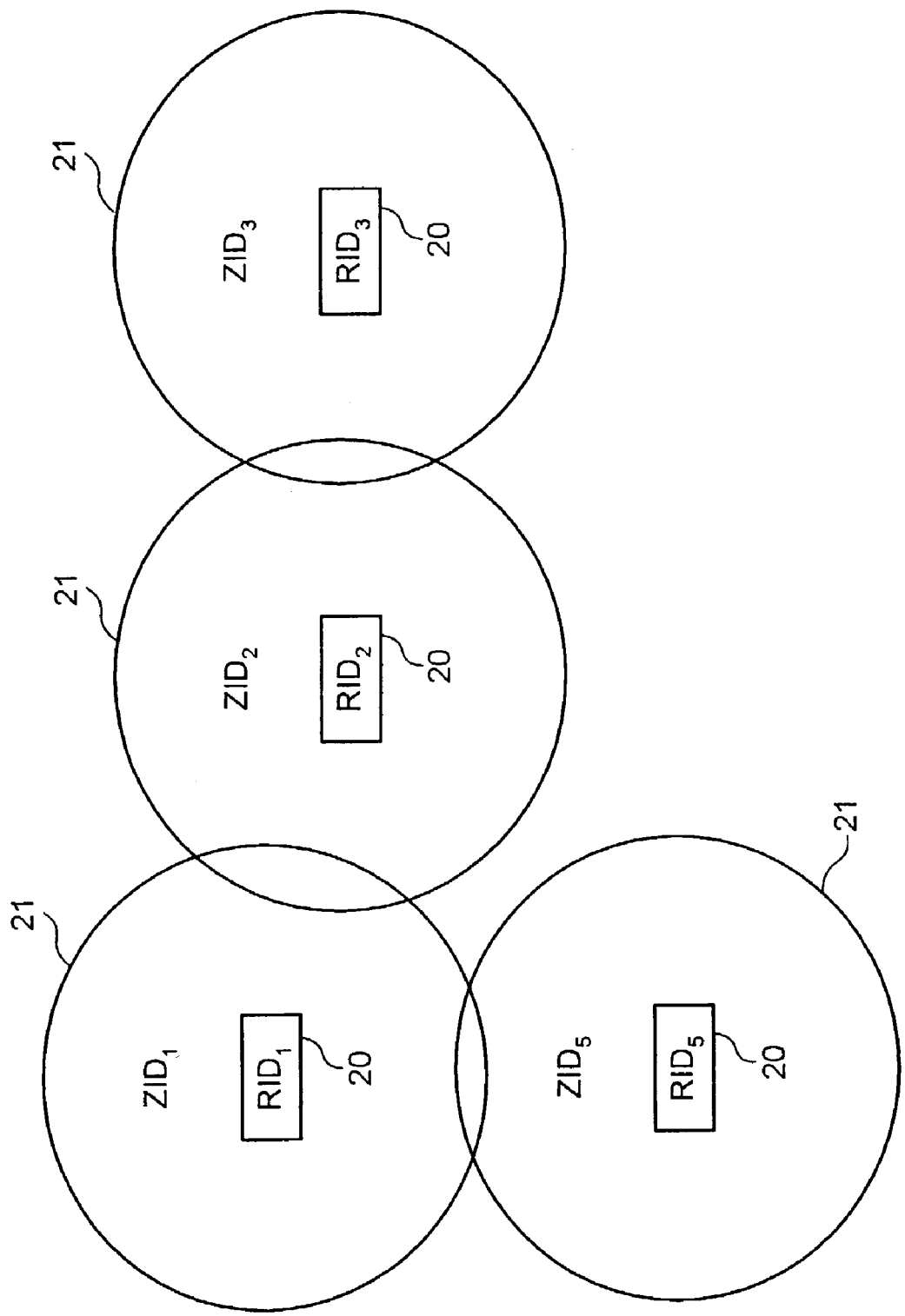
FIG. 4 explains a relation between the arrangement of the tag readers and capable range of detecting the RFID tag.

FIG. 4 explains a relation between the arrangement and the detection range of the tag readers 20. As shown in FIG. 4, it is desirable to adjust the receiving sensitivity and the position of each of the tag readers 20 in such a manner that detection ranges 21 of adjoining tag readers 20 overlap with each other so that there is no area that is not covered by any of the tag readers 20. Because of such overlap, it may happen that one RFID tag 10 is simultaneously read by a plurality of tag readers 20. However, in that case, the relay device 40 may be configured to give a priority to a specific tag reader 20 based on certain conditions.

Moreover, a timing at which a signal is transmitted from the RFID tag 10 may be set according to the distance between the adjoining tag readers 20. For example, if the distance between the tag readers 20 is relatively small, it is preferable to set the timing at a shorter interval time so as to increase the accuracy of detecting the RFID tag 10. On the other hand, the timing may be set considering factors other than the distance between the tag readers 20. For example, assuming, for example, that the persons caring the RFID tag 10 are going to walk in a building, the timing may is set as once in a few seconds. By setting an appropriate timing it becomes possible to decrease the power consumption of the RFID tag 10 compared to the case in which the RFID tag 10 transmits the signals more number of times than necessary.

As shown in FIG. 3, the walls 50 are built so as to enclose some surveillance areas. The walls 50 separate individual surveillance areas. These walls 50 prevent, to some extent, detection of one RFID tag 10 simultaneously by a plurality of the tag readers 20. That is, the walls 50 serve to decrease the work load of the tag reader 20. For this purpose, it is preferable that the walls 50 are comprised of a material or have a thickness that makes it possible to interrupt passage of the radio frequency signals transmitted from the RFID tag 10. It is needless to say that, as shown in FIG. 3, all of the surveillances areas needs not be enclosed with the walls 50.

In the same way as the walls 50, it is preferable that the doors 60 are comprised of a material or have a thickness that makes it possible to interrupt passage of the radio frequency signals transmitted from the RFID tag 10. On the other hand, if the tag reader 20 is fixed on the wall above the door 60, the door 60 can substantially interrupt the radio frequency signals even if it is not made of a specific material or does not have a specific thickness.

Returning to FIG. 1, the relay device 40 receives a signal, which includes the tag identification information, from the tag readers 20 arranged in a predetermined region. The relay device 40 appends reader information, which corresponding to the tag reader 20 that has received the signal from the RFID tag 10, to the tag identification information, and sends the resultant signal to the central monitoring device 100. If the tag readers 20 and the relay device 40 are connected to each other via separate cables, then the relay device 40 can identify from which tag reader 20 the resultant signal has been received based on from which cable the resultant signal has been received.

On the other hand, if the tag readers 20 and the relay device 40 are connected to each other via a single common cable or if the tag readers 20 and the relay device 40 communicate with each other via a radio signal, then each tag reader 20 appends own reader identification information to the tag identification information and transmits the resultant signal to the relay device 40. In this case, the relay device 40 can identify the tag reader 20 based on the reader identification information included in the received signal.

The relay device 40 also receives various instruction signals from the central monitoring device 100, and transmits the instruction signals to the tag reader 20 or to the RFID tags 10.

The central monitoring device 100 is comprised of a data management unit 101, an input device 110, a tag label reader 112, an abnormality processing unit 120, a display 130, a door controller 131, a security unit 132, a warning unit 133, a camera controller 134, a route indication unit 140, a monitoring information storage 105, a track pattern storage 160, and a video storage 150.

The data management unit 101 receives a signal from the relay device 40 and extracts the tag identification information and the reader identification information from the received signal. The data management unit 101 sends the information extracted and the time of receipt of the signal to the monitoring information storage 105. The monitoring information storage 105 stores the information and the time.

The input device 110 is for inputting various data by an operator. The data includes, for example, data that is to be registered in the monitoring information storage 105 and instructions to the central monitoring device 100. The input device 110 is, for example, a keyboard or a pointing device.

The tag label reader 112 reads the tag label affixed to the RFID tag 10.

The abnormality processing unit 120 executes an entry prohibition process, a process for detecting person not carrying RFID tag, a suspicious person detection process, and route indication process. These processes are executed according to an instruction generated by the abnormality processing unit 120 at a predetermined time interval or according to an instruction input by the operator, referring to data stored in the monitoring information storage 105, the track pattern storage 160, and the video storage 150. These processes will be described in detail later.

The display 130 displays a video (hereinafter video will mean an image or a video or both), or a message according to an instruction (hereinafter, "abnormality instruction") from the abnormality processing unit 120. The video is stored in the video storage 150. The message is based on, for example, the result of detection of entry into the surveillance area of a person who is not allowed to enter the surveillance area, a person not carrying the RFID tag, and a suspicious person. The display 130 is, for example, a cathode ray tube (CRT) display or a liquid crystal display (LCD).

The door controller 131 controls the lock mechanism 62 specified by the door identification information. The security unit 132 transmits a message indicating instruction to the portable terminal carried by a guard. The warning unit 133 transmits a signal indicating a warning for the RFID tag 10 to the relay device 40. The control of the lock mechanism 62 by the door controller 131, the transmission of the message by the security unit 132, and the transmission of the signal by the warning unit 133 are performed based on the abnormality instruction.

The camera controller 134 controls the surveillance camera 70 specified by the camera identification information and makes the video storage 150 store the video based on the abnormality instruction or an instruction from the operator. The route indication unit 140 transmits a signal indicating a route guidance instruction for the RFID tag 10 to the relay device 40 based on the abnormality instruction.

The monitoring information storage 105 stores a tag identification information table, a reader table, a person table, an attribute table, a tag-person relation table, a camera table, a door table, and a track table. These tables contain data input by the operator via the input device 110.

The tag identification information table includes, as shown in FIG. 5, an association of the tag labels and the tag identification information. This tag identification information table is referred to determine tag identification information associated with the tag label that is read by the tag label reader 112.

The reader table includes, as shown in FIG. 6, an association of the reader identification information and place information. The place information includes place code, name, and zone of the place where the tag reader 20 specified by the reader identification information is arranged.

The person table includes, as shown in FIG. 7, an association of person identification information and personal information. The person carrying the RFID tag 10 is identified from the person identification information. The personal information includes name, age, destination, and attribute information of the person that is specified by the person identification information.

The attribute table includes, as shown in FIG. 8, an association of the place code, which is in the reader table, and the attribute information, which is in the person table. Specifically, the attribute information includes attribute-1, attribute-2, and attribute-3. Although three attributes have been shown in the figure, there may be two attributes or even more than three attributes. These attributes specify whether the person is, for example, a guest, a general staff, a superior staff, a security manager, or a part-timer. Each attribute is a value that indicates whether the person is allowed to enter into the surveillance area that is identified by the place code. In the example shown in FIG. 8, a person with attribute-2 is allowed to enter into the surveillance areas with the place codes $ZID_1$ and $ZID_2$, and prohibited to enter into the surveillance area with the place code $ZID_3$.

Moreover, it is preferable that the attribute table includes an attribute for a temporary but frequent visitor. In that case, for example, first, this attribute for the visitor is initialized with the value that indicates prohibition of entry to all place codes, and then, the attribute is automatically changed to a value that indicates permission to entry into sections based on destination of the visitor in the person table of the visitor. Although not shown in the figure, the central monitoring device 100 has an attribute setting section. This attribute setting section creates the attribute table so that the surveillance areas, which are present on the best route between the entry and the destination, are set as the prohibited area for the visitor. The best route is the route that avoids majority of the prohibited areas for the visitor.

The tag-person relation table includes, as shown in FIG. 9, an association of the tag identification information and the person identification information, which is in the person table. Especially, this tag-person relation table is useful to acquire the person identification information. Next, based on the person identification information, personal information of the person carrying the RFID tag 10 can be acquired by referring to the person table (see FIG. 7).

The camera table includes, as shown in FIG. 10, an association of the camera identification information and the place code of the reader table.

The door table includes, as shown in FIG. 11, an association of the door identification information with the place code of the reader table.

The tag identification information table, the reader table, the person table, the attribute table, the tag-person relation table, the camera table, and the door table are mutually in the normalized relation, and construct the relational database. For example, the attribute table, the camera table, and the door table are associated with the place code, because, there is less probability that the place code is changed. As a result, even if one of the tag readers 20 has broken down and thus this tag reader 20 must be exchanged for new one, the reader identification information of the tag reader 20 that has broken down is merely changed in the reader table. In this way, it becomes possible to reduce the work load, for changing the information, on the manager of the system.

The track table is managed by the data management unit 101. The track table includes, as shown in FIG. 12, an association of the place code with time information in the tag identification information. The time information includes entry time ($t_0$), exit time ($t_1$), and stay period, in seconds, with respect to the surveillance area that is specified by the place code.

The video storage 150 stores video and layout images. The video is acquired from the surveillance cameras 70 via the camera controller 134. The layout images show the plan view of the surveillance areas and the arrangements of the tag readers 20 and the like as shown in FIG. 3. It is preferable that the video and the layout images are encoded and compressed. Especially, it is desirable that the video is encoded in such a manner of encoding an individual object, for example, MPEG-4 (Moving Picture Coding Experts Group Phase 4). As a result, it becomes easy to take out the object such as the background image and the person from the video. Thus, it is possible to reduce, in the abnormality processing unit 120, the load of processing such as extraction of the person from the image and detection of person's movements. The surveillance camera 70 may be configured to execute such encoding and compression.

The track pattern storage 160 stores a track pattern that represents a suspicious action, in the form of numerical values or a character string according to a predetermined rule. This track pattern is referred to in the suspicious person detection process that is described in detail later.

The central monitoring device 100 is an information processor such as a personal computer or a work station. The central monitoring device 100 is comprised of a main processing unit (MPU), a secondary storage such as a memory and a hard disk drive (HDD), output devices such as a display unit and/or a printer, and input devices such as a keyboard and/or a mouse. The central monitoring device 100 may further serve the same function as the tag reader 20 and read the tag identification information of the RFID tag 10 thereby.

The entry prohibition process, the process for detecting person not carrying the RFID tag, the suspicious person detection process, and the route indication process will be explained in detail below.

Figure 13:
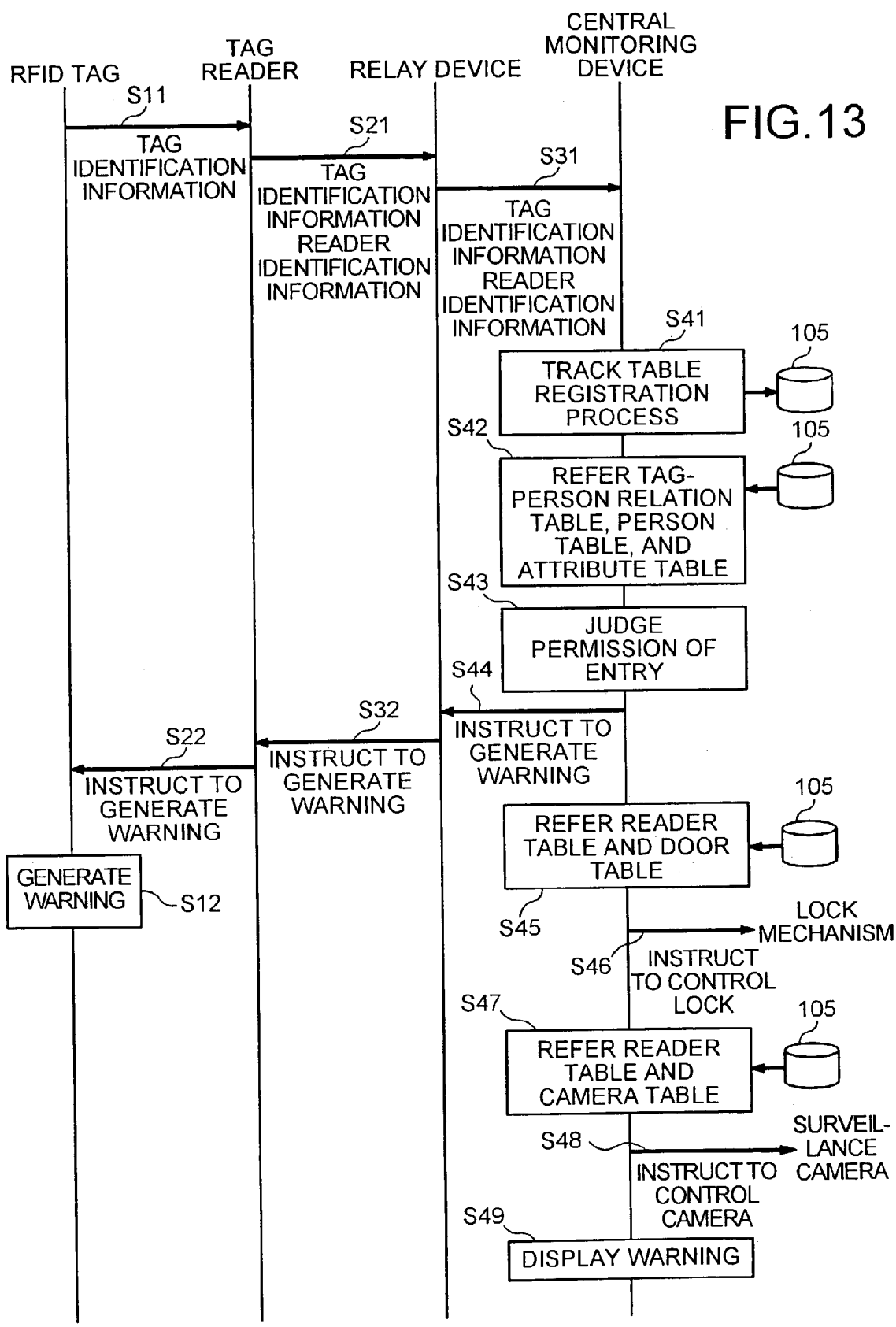
FIG. 13 is a flowchart that explains an enter prohibit process.

FIG. 13 is a flowchart of entry determination process. It is assumed here that the tag readers 20 are connected to the relay device 40 through a single common cable.

The RFID tag 10, which is carried by a person, periodically transmits own tag identification information. When the person enters into the surveillance area, the tag reader 20 in that surveillance area receives the tag identification information of the RFID tag 10 carried by that person (step S11). In other words, the tag reader 20 can detect and identify the RFID tags 10 existing in the surveillance area. The tag reader 20 appends own reader identification information to the tag identification information and transmits the resultant signal to the relay device 40 (step S21). The relay device 40 receives the signal, that is the tag identification information and the reader identification information, and transmits the set of information to the data management unit 101 of the central monitoring device 100 (step S31).

The data management unit 101 executes a track table registration process based on the received tag identification information and the reader identification information (step S41). In the track table registration process, concretely, first, the data management unit 101, by referring to the monitoring information storage 105, confirms whether the track table of the tag identification information received has been created. If it is determined that the track table has not been created, the monitoring information storage 105 creates a track table of the corresponding tag identification information. Then, the data management unit 101 refers to the reader table (see FIG. 6) and determines the place code corresponding to the reader identification information received. Further, the data management unit 101 registers this place code in the place code field of the track table (see FIG. 12) (hereinafter, "first registration process").

Next, if an entry time corresponding to this place code has not been registered, the data management unit 101 registers the time (hereinafter, "reception time") at which the tag identification information and the reader identification information were received as the entry time (hereinafter, "second registration process"). On the other hand, if an entry time has been recorded corresponding to this place code, then the data management unit 101 registers the reception time as an exit time (hereinafter, "third registration process"). The data management unit 101 repeats the third registration process until the place code has changed. When the place code has changed, the data management unit 101 executes the first registration process with respect to the changed place code. Once the entry time and the exit time are registered in the track table, the data management unit 101 calculates the stay period from the entry time and the exit time, and registers the stay period in the track table.

In this manner, the track table is updated at the timing that the data management unit 101 receives the tag identification information and the reader identification information from the relay device 40. It is assumed here that each tag reader 20 is given the priority of detecting the RFID tag 10.

Thus, the place code is a record of movements of each of the RFID tags 10. Since the place code is the primary key in the track table for each tag identification information, even if the reader identification information has been changed due to the failure of the tag reader 20, it is possible continuously to refer to past movement history of the RFID tag 10.

The abnormality processing unit 120 executes the entry determination process periodically or when the track table is updated. In this entry determination process, the abnormality processing unit 120 refers to the tag-person relation table (see FIG. 9) and determines the person identification information based on the tag identification information, refers to the person table (see FIG. 7) and determines the attribute information based on the person identification information, refers to the attribute table (see FIG. 8) and obtains information about whether the person is allowed or prohibited to enter (hereinafter, "information of the permission or prohibition") based on the attribute information (step S42 in FIG. 13). Furthermore, the abnormality processing unit 120 acquires the place code registered at the first registration process from the information of the permission or prohibition. If the value acquired indicates the prohibition of the entry, the abnormality processing unit 120 judges that the person carrying the RFID tag 10 of the tag identification information received at the first registration process is not allowed to enter into the surveillance area specified at the, first registration process (step S43).

The abnormality processing unit 120, when judging the prohibition of the entry, specifies the tag identification information and the reader identification information from the track table and the reader table. Then, the abnormality processing unit 120 transmits a first warning signal to the warning unit 133. The warning signal includes the tag identification information, the reader identification information, and a warning instruction.

The warning unit 133 transmits this first warning signal to the relay device 40 (step S44). The relay device 40 extracts the tag identification information, the reader identification information, and the warning instruction from this first warning signal, and transmits a second warning signal to the tag reader 20 specified by this reader identification information (step S32). The second warning signal includes the tag identification information and the warning instruction. The tag reader 20 extracts the tag identification information and the warning instruction from the second warning signal and transmits a third warning signal to the RFID tag 10 specified by this tag identification information (step S22). The third warning signal includes the tag identification information and the warning instruction.

The RFID tag 10 extracts the warning instruction from the third warning signal and activates the warning generator 9 (see FIG. 2) according to the warning instruction (step S12). The warning generator 9 controls any one or more of the light emitter 16, the speaker 17, and the vibrator 18 so as to emit light, output an alarm, or vibrate the RFID tag 10.

As a result, the person carrying the RFID tag 10 comes to know that he has entered into an area in which he is not suppose to enter. At the step S12, the speaker 17 may be configured to gradually increase the volume of the alarm. In that case, at the initial stage, when the volume is low, only the person carrying the RFID tag 10 will hear the warning and take appropriate measures. However, if the person does not take appropriate measures, then the volume will become louder and louder and persons around this person, for example, a guard, will come to know that somebody is entering into an area in which he is not supposed to. This makes it possible to inform an entry of a person into the prohibited area to persons around that person and determine the person as a suspicious person.

In addition to transmitting the first warning signal to the relay device 40, the abnormality processing unit 120 confirms, by referring to the reader table and the door table, whether the surveillance area into which the person has entered and the surveillance areas near that surveillance areas have the lock mechanism 62 (step S45). If these surveillance areas have the lock mechanism 62, the abnormality processing unit 120 further confirms, by referring to the attribute table, whether the lock mechanism 62 is located in the prohibited area for the tag identification information received at the step S31. If the lock mechanism 62 is located, the abnormality processing unit 120 transmits a door control signal to the door controller 131 (step S46). The door control signal includes the door identification information specifying the lock mechanism 62 located in the prohibited area and a lock instruction.

Thus, the lock mechanism 62, when receiving the lock instruction from the door controller 31, locks the corresponding door. As a result, it is possible to prevent the person from entering into the surveillance area via the door. If the door is locked in this way, it is unlocked when the person goes away from the prohibited area. Concretely, the abnormality processing unit 120, by referring to the track table, outputs an unlock instruction with respect to the lock mechanism 62 via the door controller 131 so that the locked door returns to an unlocked state.

Moreover, the abnormality processing unit 120 specifies the camera identification information by referring to the reader table and the camera table (step S47). Then, the abnormality processing unit 120 transmits a camera control signal to the camera controller 134 (step S48). The camera control signal includes the camera identification information specified and a camera control instruction.

The camera control instruction indicates operation, for example, start-up and zooming, of the surveillance camera 70 specified by the camera identification information. In this case, moreover, the abnormality processing unit 120 may allow the display 130 to display the image taken by the surveillance camera 70 in real time. In addition, the abnormality processing unit 120 may cross-refer to the movements history of the RFID tag 10 in the track table and the video of the surveillance camera 70 in the video storage 150, and make the display 130 display the images of the past behavior of the suspicious person. Furthermore, the abnormality processing unit 120, by referring to the track table and the camera table, may switch the surveillance camera in the surveillance area where the RFID tag 10 is detected to a main camera. This makes it possible to track the person decided as suspicious.

The abnormality processing unit 120 allows the display 130 to display the message or image indicating that a person has been detected in the prohibited area (step S49). In this case, by referring to the various tables mentioned above, the abnormality processing unit 120 may make the display 130 display other information such as the surveillance area information, the person information, and the tag identification information.

The abnormality processing unit 120 may be configured to transmit a guard signal to the security unit 132. This guard signal includes the surveillance area information, the personal information, the tag identification information and the like. The abnormality processing unit 120 may be configured to transmit the guard signal only when the stay period in the prohibited area exceeds the predetermined time.

The warning processes of the abnormality processing unit 120 as described above may be combined or one of them may be selected depending on situations.

In this monitoring system, since the attribute information is managed by the central monitoring device 100, if necessary, for example, it is easy to change the attribute information depending on the situation. For example, the attribute information may be changed based on a number of times the person is to be warned.

In this monitoring system, moreover, since it is possible to output a warning to the suspicious person, an entry of the suspicious person in the prohibited area can be prevented even if the doors 60 or the walls 50 are not provided. For example, if the person carrying the RFID tag 10 approaches near the prohibited area, then if an alarm is output from the RFID tag 10 or if the RFID tag 10 is made to vibrate, the person will come to know that he is not allowed to enter the area he approaching so that the doors 60 or the walls 50 become unnecessary.

The monitoring system judges whether to execute the warning process depending on the current position of the RFID tag 10. Therefore, the warning processes may be registered as the history of usage of the RFID tag 10 in the track table. As a result, it becomes easy to identify the person who has been warned again and again (that is, the suspicious person).

Especially, in this case, the abnormality processing unit 120 makes the display 130 display the plan view, which is stored in the video storage 150 (same as the one shown in FIG. 3), of the surveillance area. Further in this case, the abnormality processing unit 120, by referring to the various tables mentioned above, makes the display 130 display in the plan view an arrangement of the tag readers 20. Then, for example, the mark indicating the arrangement of the RFID tag 10, for which the warning process has been repeated for more than a predetermined times (for example, three times), is displayed with a special display mode, for example, displayed with a different color or made to blink.

Thus, it is possible to easily recognize the existence and the position of the suspicious person. Moreover, if there is a RFID tag 10 for which the warning process is repeated for more than the predetermined times, then the abnormality processing unit 120 may transmit the camera control signal to the camera controller 134 and make the camera take a video of particularly the surveillance area where this RFID tag 10 is located.

The abnormality processing unit 120 may be configured to execute the warning process based on the track pattern stored in the track pattern storage 160.

It has been mentioned above that the attribute in the attribute table indicates either the permission or prohibition of the entry, however, the attribute may indicate any other status such as null.

As explained above, the detection ranges of the adjoining tag readers 20 have an overlap as shown in FIG. 4. If an RFID tag is in the overlapping area and it is detected simultaneously by two rag readers, then the abnormality processing unit 120 may be configured to determine one tag reader as the tag reader that has detected the RFID tag (hereinafter, "effective tag reader") based on the permission or prohibition of the entry stored in the attribute table. That is, which tag reader is to be made an effective tag reader is determined based on the attribute of the person entering the surveillance area.

Figure 14:
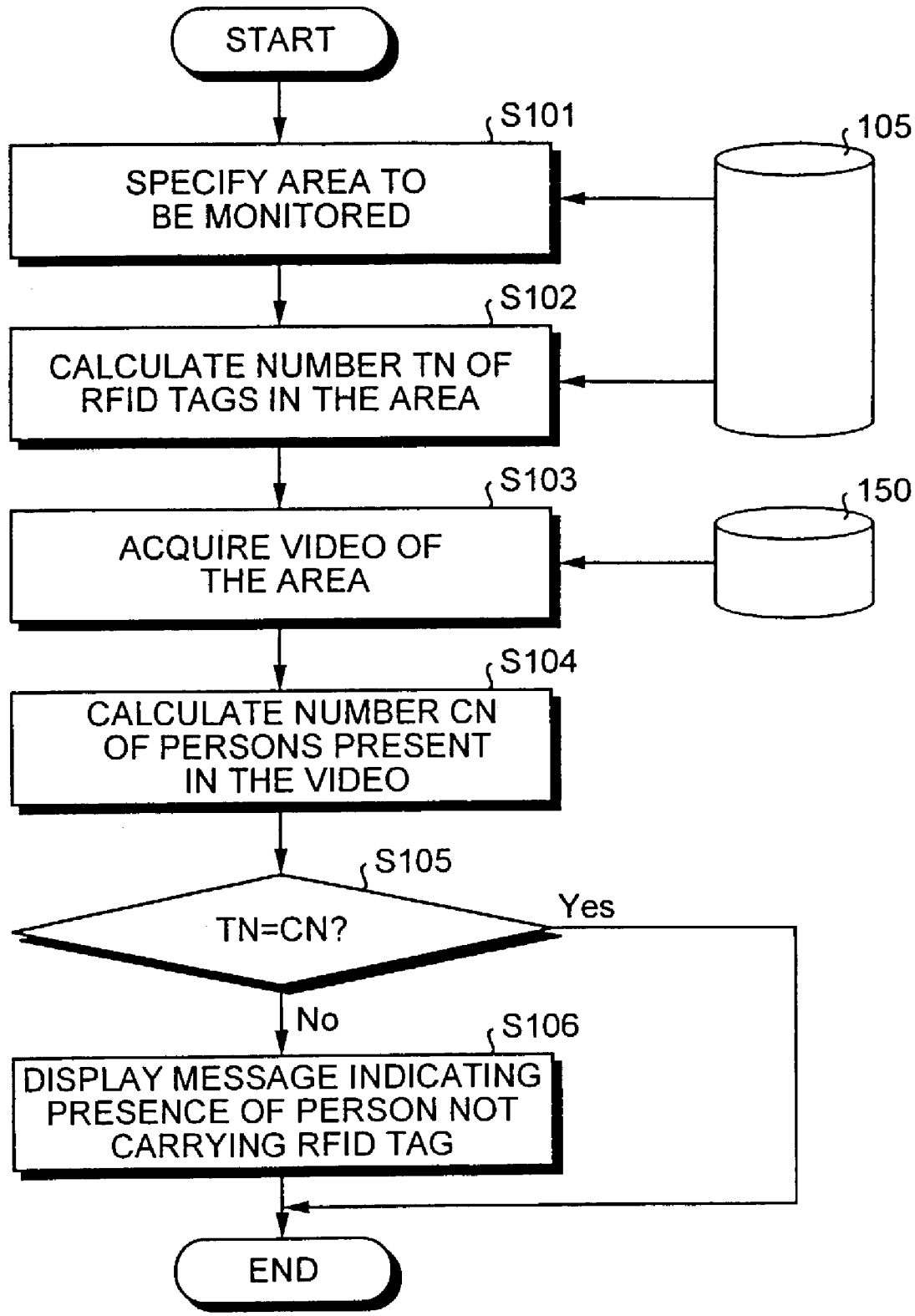
FIG. 14 is a flowchart that explains a process for detecting a person not carrying the RFID tag.

The process for detecting person not carrying the RFID tag will be explained in detail below with reference to FIG. 14. This process is executed by the central monitoring device 100.

First, the surveillance area to be a target (hereinafter, "target area") is specified (step S101). Concretely, the operator specifies the area by using the input device 110. Alternatively, the abnormality processing unit 120, by referring to the reader table, periodically specifies the surveillance areas one by one.

The abnormality processing unit 120 extracts the tack table from the monitoring information storage 105. The track table includes both the place code of the target area and the record which does not register the exit time, but register the entry time. Thus, the abnormality processing unit 120 specifies the tag identification information corresponding to the track table extracted. Moreover, the abnormality processing unit 120 calculates the number TN of the RFID tags 10 in the target area (step S102).

Furthermore, the abnormality processing unit 120 determines the camera identification information from the camera table for the place code of the target area, and acquires the latest video from the video storage 150 based on the camera identification information (step S103). Next, the abnormality processing unit 120 calculates the number CN of the persons present in the video (step S104).

Next, the abnormality processing unit 120 judges whether TN is equal to CN (step S105). In other words, the abnormality processing unit 120 judges whether the number of RFID tags is same as the number of persons in the area. If not, the abnormality processing unit 120 judges whether CN is greater than TN. If the value of CN is greater than that of TN, for example, by one, it means that there is one person in the video who is not carrying the RFID tag 10, and in this case the abnormality processing unit 120 makes the display 130 display a message indicating presence of a person not carrying the RFID tag 10 (step S106). If it is decided in the step S105 that the values of CN and TN are equal, then the abnormality processing unit 120 either does nothing or makes the display 130 display values of CN and TN.

Figure 15:
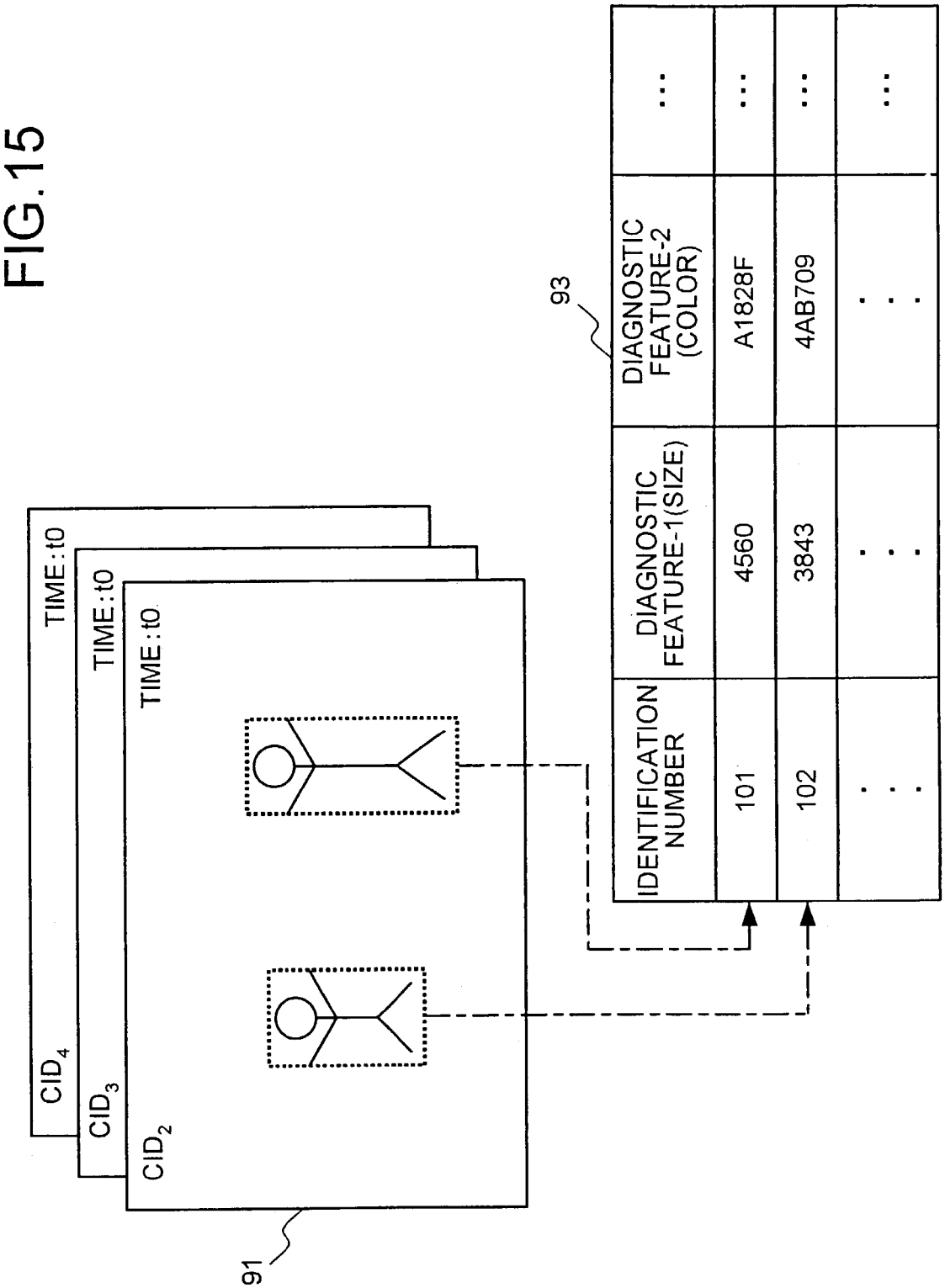
FIG. 15 is a diagram that explains how a person in a video is recognized.

Moreover, at the step S104, the abnormality processing unit 120, in addition to calculating CN, may be configured to identify, by referring to the track table, the person who does not carry the RFID tag 10. In this case, for example, as shown in FIG. 15, person objects in the image 91 are detected and characterized by diagnostic features such as height, color, and clothes. Then, identification number is assigned to each of the person objects and recorded in a predetermined table 93. In addition, the abnormality processing unit 120 specifies, the person object recognized with a combination of the same diagnostic feature between different images, by the identification number.

Thus, the abnormality processing unit 120 creates a person recognition table shown in FIG. 16. The person recognition table indicates an association of the identification number with the time of the recognition and the place code of the target area. Then, the abnormality processing unit 120 extracts, the movements history of the RFID tag 10 which has the combination of the same time as that of the person recognition table, from the track table. This movements history is, in detail, a tag movement history table that associates the tag identification information with the place code and time. Next, the abnormality processing unit 120 compares this tag movements history table and the person recognition table, and excludes the record which has the same transition of the place code as that of the tag movements history table from the person recognition table. As a result, the abnormality processing unit 120 decides the person object specified by the remaining record as a person not carrying the RFID tag 10.

Figure 17:
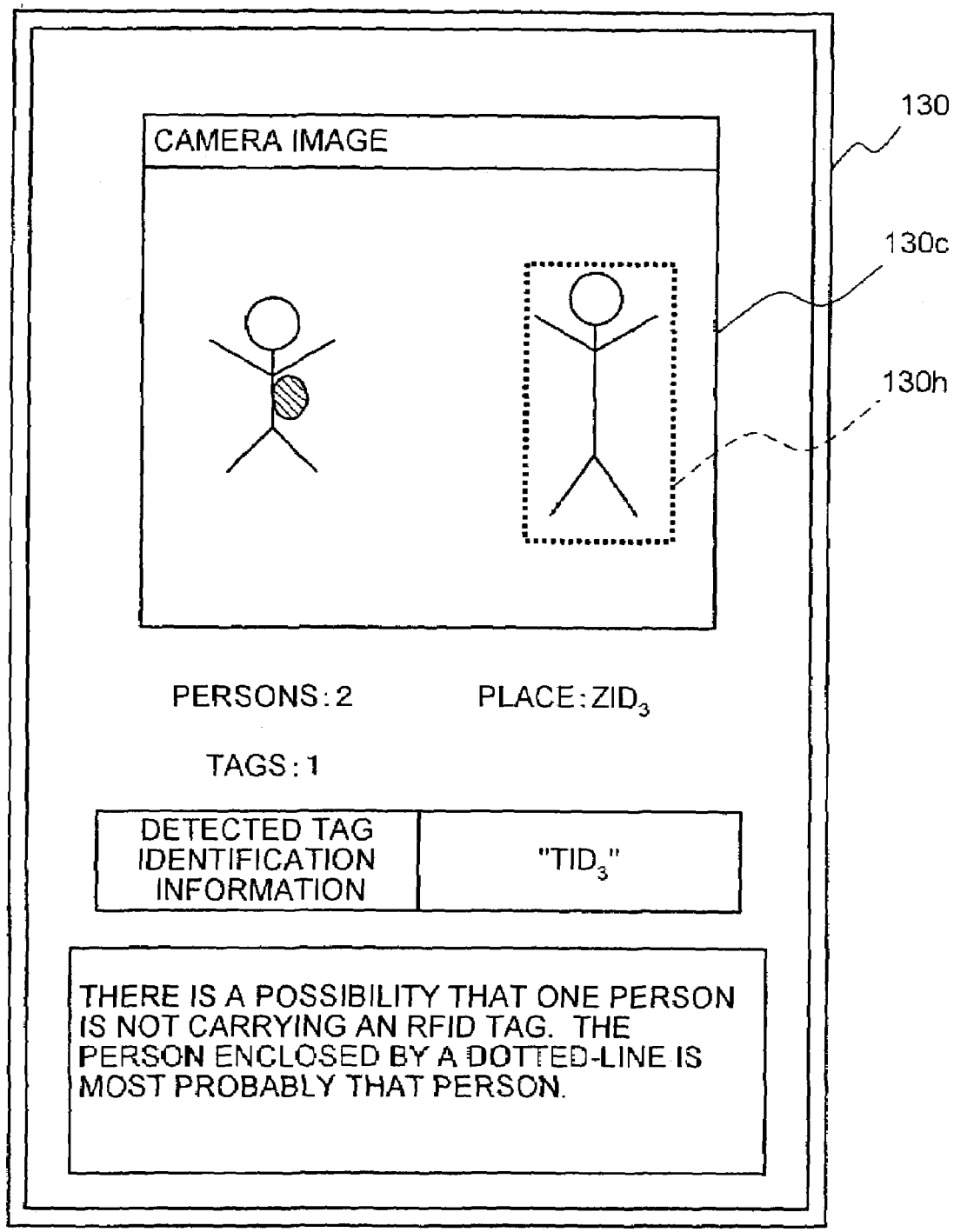
FIG. 17 shows one example of message indicating presence of a person not carrying the RFID tag.

When the person not carrying the RFID tag 10 is identified, the abnormality processing unit 120 may be configured to make, as shown in FIG. 17, the display 130 display the camera image 130c and to highlight the person object 130h corresponding to the person not carrying the RFID tag 10.

Moreover, the abnormality processing unit 120 may be configured to cause, as shown in FIG. 17, the display 130 to display the value of TN calculated at the step S102 (see FIG. 14), the value of CN calculated at the step S104 (see FIG. 14), the tag identification information of the RFID tag 10 detected, and a message indicating presence of the person not carrying the RFID tag 10. For example, as shown in FIG. 17, assuming that the value of CN is "2" and the value of TN is "1", then a message "there is a probability that one person is not carrying an RFID tag. The person enclosed by dotted-line is most probably that person." is displayed on display 130.

Figure 18:
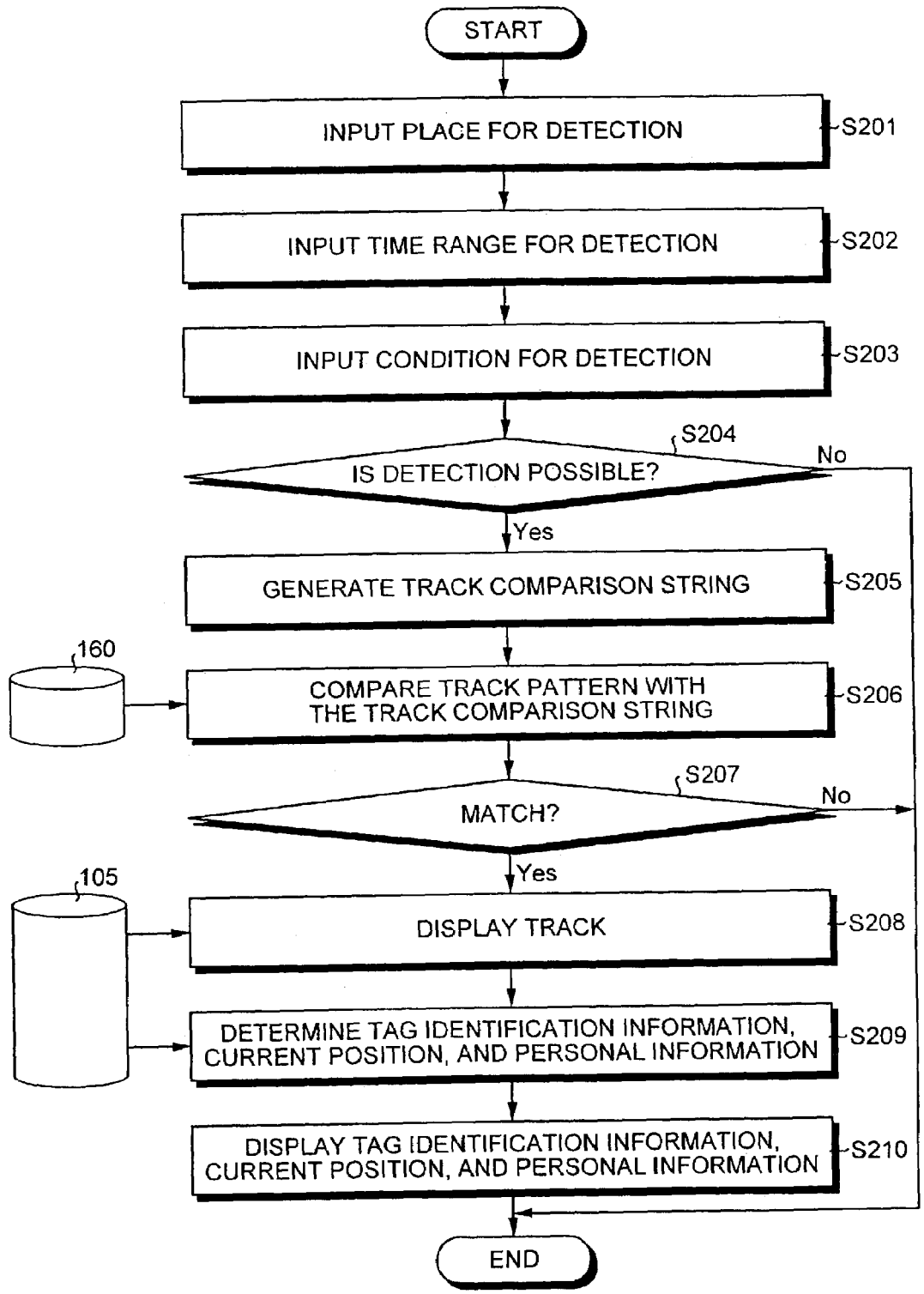
FIG. 18 is a flowchart that explains a suspicious person detection process.

The suspicious person detection process will be explained now in detail with reference to FIG. 18. This suspicious person detection process is executed by the central monitoring device 100.

First, an operator inputs, by using the input device 110, a place in which a suspicious person to be detected (step S201), a range of time during which the suspicious person is to be detected (step S202), and a condition to detect the suspicious person (step S203). At the step S201, two or more surveillance areas may be input as the place. At the step S203, the condition is, for example, whether 100 persons have been identified in the place that is input at the step S201, or whether there is a person having specific personal information.

Next, the abnormality processing unit 120 judges whether movements history of the RFID tag 10 which meets the data for detection has been recorded in the track table (step S204). The data for detection is the place, the range of time, and the condition that are input at the steps S201 to S203 respectively. If it is decided that the data has been recorded, the abnormality processing unit 120 acquires the movements history which meets the data for detection and generates a track comparison string from the data acquired (step S205).

Figures 19, 20:
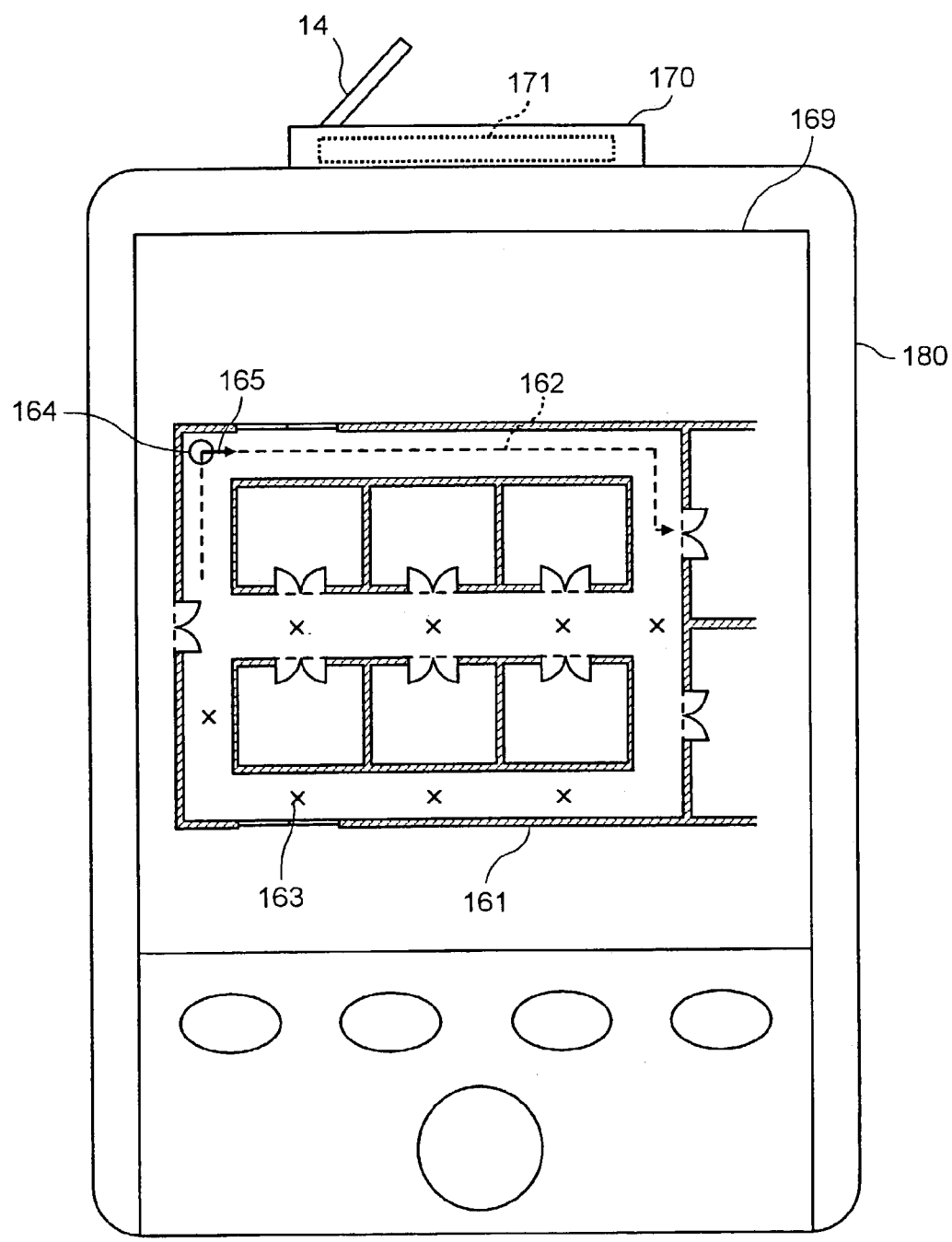
FIG. 19 shows one example of a track comparison string.
FIG. 20 shows one example of route indication display.

FIG. 19 shows one example of the track comparison string. The track comparison string is comprised of a character string that indicates the place code and the stay period with respect to each tag identification information corresponding to the data acquired at the step S205. For example, one character in the track comparison string indicates that the RFID tag 10 specified by the tag identification information has stayed for one minute in the surveillance area corresponding to the place code which the one character represents. In FIG. 19, for easy understanding, the place codes $ZID_1$, $ZID_2$, and $ZID_3$ are represented by A, B, and C respectively. Therefore, the track comparison string shown in FIG. 19 represents movement of the RFID tag 10 that has stayed in the surveillance area specified by the place code $ZID_1$ for 30 minutes, then stayed in the surveillance area specified by the place code $ZID_2$ for 10 minutes, next stayed in the surveillance area specified by the place code $ZID_3$ for five minutes, and finally once more stayed in the surveillance area specified by the place code $ZID_2$ for one minute.

The abnormality processing unit 120 compares the track comparison string with each track pattern stored in the track pattern storage 160 (step S206). Examples of the track pattern are described as follows.

Track pattern 1—The RFID tag 10 has stayed in the same surveillance area for a longer time than a predetermined time. This pattern is in order to detect a person who stays in one area for a longer time than necessary. In other words, this track pattern may be used to detect an RFID tag 10 that is thrown away by the person carrying it or that has been fallen from the hands of the person carrying it.

Track pattern 2—The RFID tag 10 has shuttled between two surveillance areas for a number of times greater than a predetermined number, within a predetermined time. In other words, this pattern may be used to detect a person who is wandering or who has got lost.

Track pattern 3—The RFID tag 10 has shuttled between a predetermined number of the surveillance areas for a number of times greater than a predetermined number, within a predetermined time. In other words, this pattern may be used to detect a person who is moving faster than necessary.

The above track patterns may also be represented by a combination of a code "*", which indicates a character or a character string, and a place code. For example, the above track pattern 1 may be represented as, when the predetermined time is one hour, PAT1 as follows:

$PAT1 = AAA \ldots A$ (a series of 60 characters "$A$"), where "A" indicates the place code of the surveillance area.

Similarly, the above track pattern 2 may be represented as, when the predetermined time is 30 minutes and the predetermined number is three, PAT2 as follows:

$PAT2 = A*B*A*B*A*B$ and $LEN[PAT2]=30$, where "A" and "B" indicate place codes, symbol "*" means at least one arbitrary character, and "LEN[PAT2]=30" means that the predetermined time is 30 minutes.

The abnormality processing unit 120 verifies whether the track comparison string includes such a track pattern. For example, consider that a track comparison string for some person is FFFFAACCCCBDAEBFFAEEEBCCCAEEEEEE This track comparison string does not match with the PAT1, however, matches with the PAT2. In other words, the person has shuttled between areas A and B at least for three times within 30 minutes.

The track pattern storage 160 may be configured to store track patterns other that the ones mentioned above. As an example, a track pattern that detects whether there is the RFID tag 10 which is out of the surveillance area may be stored in the track pattern storage 160. As an example, a track pattern that detects whether there is the RFID tag 10 which has been destroyed by intention or which is not functioning properly.

At the step S206, the abnormality processing unit 120, determines whether real track pattern matches with the track comparison string stored in the track pattern storage 160. If it is decided that the real track pattern matches with the track comparison string (step S207, Yes), the abnormality processing unit 120, generates, by referring to the track table, movement history (i.e., track) of the RFID tag 10 behaving as the track comparison string, and causes the display 130 to display the track generated (step S208). Furthermore, the abnormality processing unit 120 determines, by referring to the various tables explained above, the tag identification information, the surveillance area corresponding to the current position of the RFID tag 10, and the personal information (step S209). Then, the abnormality processing unit 120 causes the display 130 to display these information (step S210).

The abnormality processing unit 120 may be configured not only to compare the track comparison string and the track pattern but to verify a correlation between two track comparison strings. Concretely, the abnormality processing unit 120 calculates, by comparing similarities used in the genome field, the similarity between two track comparison strings. As a result, when the similarity is greater than a predetermined degree, the person behaving as the track comparison string is decided as suspicious.

Furthermore, the suspicious person may be decided not only by the track but by a track pattern that is defined based on the personal information. For example, the abnormality processing unit 120 may be configured to, by referring to the personal information of the person table, judge whether the person is the guard or on the blacklist (e.g., malfeasant list).

The route indication process will now be explained in detail below. This route indication process is executed by the route indication unit 140 of the central monitoring device 100. The RFID tag 10, in order to receive a routing instruction from this route indication unit 140, must be provided with functions same as a PC card. As shown in FIG. 20, the PC card 170 is composed of a wireless transmitting/receiving unit 171 and the antenna 14. The wireless transmitting/receiving unit 171 includes the tag identification storage 11, the transmitter 12, the switch 13, and the receiver 15 shown in FIG. 2. This PC card 170 is inserted into a portable information terminal 180 such as the personal digital assistant. On the other hand, the warning generator 9 shown in FIG. 2 is installed in the portable information terminal 180. That is, a display, a speaker, and a vibrator of the portable information terminal 180 correspond to the light emitter 16, the speaker 17, and the vibrator 18 respectively.

The route indication unit 140 acquires video from the video storage 150. Moreover, the route indication unit 140 extracts, from the monitoring information storage 105, information of the prohibited area and position information of the portable information terminal 180 that functions as the RFID tag 10. The route indication unit 140 transmits the information acquired to the portable information terminal 180 via the relay device 40.

The portable information terminal 180 receives the information through the antenna 14 and the wireless transmitting/receiving unit 171. As a result, the portable information terminal 180 causes, as shown in FIG. 20, the display 169 to display the image that indicates a map 161 of the surveillance areas, a route line 162, prohibited area marks 163, a current position mark 164, and a direction mark 165.

Specially, the portable information terminal 180 must include, to display the direction mark 165, a direction detecting unit such as a gyroscope and a geomagnetic direction sensor. The portable information terminal 180 must also have a function of generating an image for the direction mark 165 that turns according to the output of the direction detecting unit.

The portable information terminal 180 may be configured to cause the display 169 to change color of the marks depending on the situation. For example, the direction mark 165 may be displayed in green (or blue) when the person carrying the portable information terminal 180 moves along a proper route or moves toward a proper destination or towards an exit. On the other hand, the direction mark 165 may be displayed in red when the person moves towards a prohibited area or displayed in yellow in other cases. If the direction mark 165 is displayed in this manner, the person can easily know whether he is following a proper route. Since such a display is possible with simple and low cost light emission diodes the costly PDA is not necessarily required.

Figure 21:
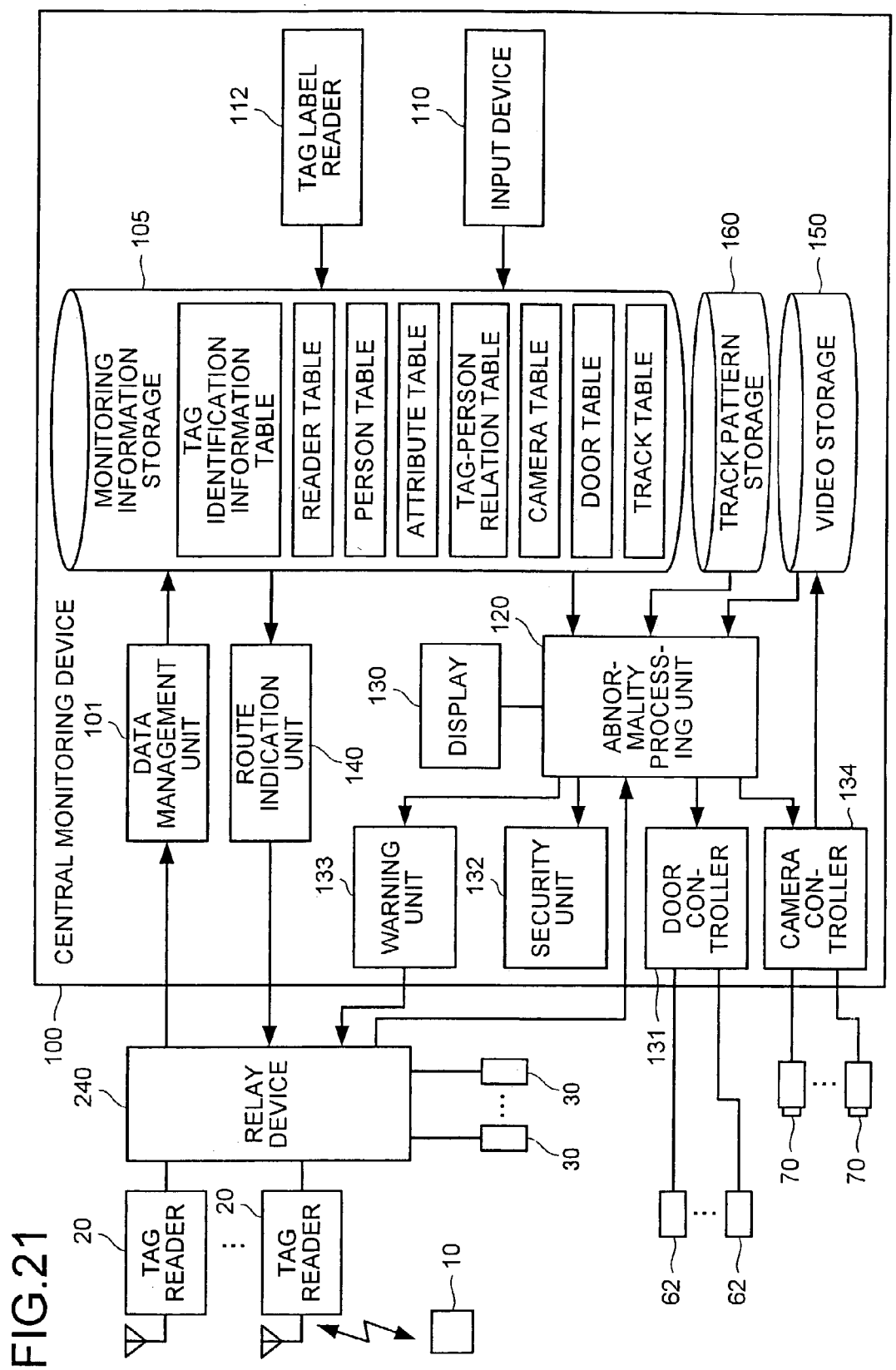
FIG. 21 schematically shows a configuration of the monitoring system according to another embodiment of the present invention.

Another embodiment relating to the present invention will be explained below. FIG. 21 schematically shows a configuration of the monitoring system according to another embodiment of the present invention. In this monitoring system, the components that perform same or similar functions or have same or similar configurations as those shown in FIG. 1 have been denoted with the same reference numerals and their explanation is omitted to avoid simple repetition of explanation.

The monitoring system shown in FIG. 21 is different from the system shown in FIG. 1 in that the relay device 240 is provided in place of the relay device 40, moreover, a plurality of human sensors 30 are provided. One human sensor 30 is arranged in each the surveillance area in the same manner as the tag reader 20. The human sensor 30 detects presence of a person in the corresponding surveillance area. The human sensor 30 may perform the detection based on infrared light, voice, weight, or electric waves of a portable device (e.g., a mobile phone) carried by the person. This embodiment is characterized by detecting a person not carrying the RFID tag 10 by using the human sensor 30.

Figures 22, 23:
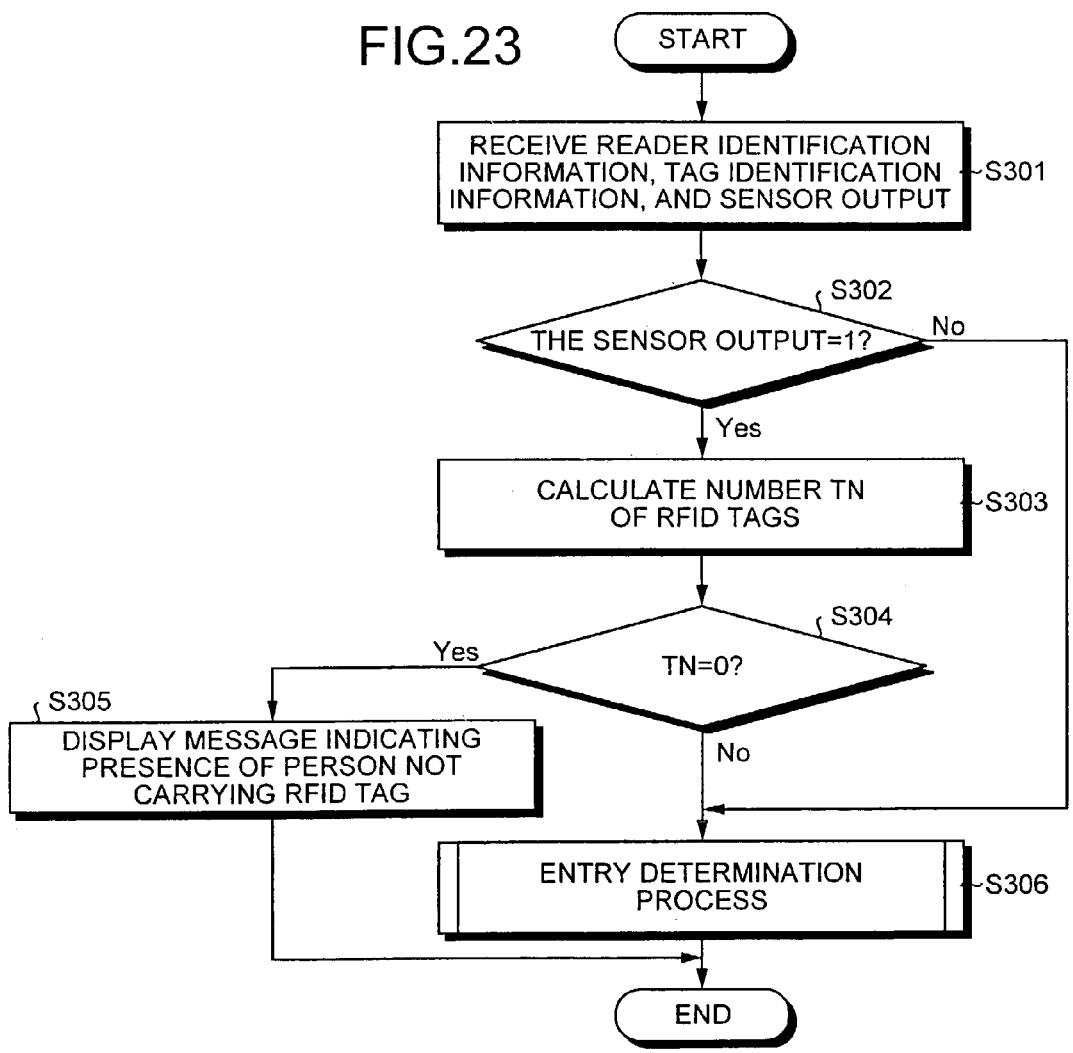
FIG. 22 is a table that is transmitted by a relay device to an abnormality processing unit.
FIG. 23 is a flowchart that explains a process for detecting person not carrying the RFID tag.

The relay device 240 has the same functions as the relay device 40 shown in FIG. 1, and in addition to it, collects the result of detection by the human sensors 30. The relay device 240 transmits detection information to the abnormality processing unit 120 at a predetermined interval. This detection information includes a correlation of the reader identification information, the tag identification information, and result of detection by the human sensor 30 for each surveillance area, as shown in FIG. 22. For example, "0" in sensor output (that is, the output of the human sensor 30) means that the human sensor 30 did not detect a person and "1" means that the human sensor 30 detect a person.

FIG. 23 is a flowchart that explains a process for detecting person not carrying the RFID tag 10. The abnormality processing unit 120 receives the information in the correlation table shown in FIG. 22 from the relay device 240 (step S301), and verifies whether the output of the human sensor 30 of the correlation table indicates "1" (step S302). If the output indicates "1", that is, if there is at least one person in the surveillance area, the abnormality processing unit 120 calculates the number of the tag identification information from the correlation table, and thereby acquires the number TN of the RFID tags 10 that have been detected in the surveillance area (step S303).

If the value of TN is zero (step S304, Yes), the abnormality processing unit 120 causes the display 130 to display a message that indicates presence of a person not carrying the RFID tag 10 in the surveillance area (step S305). On the other hand, when the value of TN is not zero (step S304, no) or when the output of the human sensor 30 is not "1" (step S302, no), then the entry determination process is executed (step S306). Concretely, the abnormality processing unit 120 executes the steps S42 to S49, the relay device 240 executes the step S32, the tag reader 20 executes the step S22, and the RFID tag 10 executes the step S12.

As explained above, in the method for monitoring person's movements according to the present invention, the abnormality processing unit 120 can control the entry of the person into the surveillance area based on information about the entry of the permission or prohibition that is recorded in the attribute table, and current position and movements history of the RFID tag 10 that are recorded in the track table.

Moreover, even if the RFID tag 10 is not functioning properly, left behind or lost and not carried by the person, it is possible to detect this situation and a place where such parson is present. As a result, the method guarantees a precise control on the entry of a person into the surveillance area.

Furthermore, the abnormality processing unit 120 recognizes the attribute information of the person, by means of analyzing the track of the person from the position history of the RFID tag 10 that is recorded in the track table. As a result, it is possible to detect the suspicious person based on the attribute information.

In addition, the route indication unit 140 transmits the data stored in the monitoring information storage 105 and the video storage 150, to the portable information terminal 180 that functions as the RFID tag 10. As a result, by using the data, it is possible to navigate the person entering the surveillance area.

The method according to the present invention may be executed as a computer program. Moreover, in the above embodiments, a program that executes the entry determination process, the process for detecting person not carrying the RFID tag, the suspicious person detection process, and the route indication process, may be recorded on a computer-readable recording medium. For the recording medium, there may be used an optical disk, a flexible disk, a hard disk, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A monitoring method comprising:
    acquiring tag identification information that is unique to a radio frequency identification tag carried by a person, and reader identification information that is unique to a tag reader capable of detecting the radio frequency identification tag in a predetermined area;
    recording positional history that indicates position of the radio frequency identification tag at a certain time based on timing at which the tag identification information and the reader identification information are acquired;
    acquiring a set of the tag identification information and the reader identification information corresponding to a predetermined time based on the positional history, wherein the acquiring of the tag identification information and the reader identification information is performed at the acquiring based on the set of the tag identification information and the reader identification information;
    acquiring attribute information that is information about the person carrying the radio frequency identification tag based on the tag identification information acquired;
    acquiring area information that is information about the predetermined area based on the reader identification information; and
    determining whether the person carrying the radio frequency identification tag is allowed to enter the predetermined area based on the attribute information and the area information.

2. The monitoring method according to claim 1, further comprising detecting the presence of the person in the predetermined area by a human sensor,
    wherein the determining is performed based on an output of the human sensor.

3. The monitoring method according to claim 1, further comprising outputting a warning when it is determined that the person carrying the radio frequency identification tag is not allowed to enter the predetermined area.

4. The monitoring method according to claim 3, wherein the outputting includes displaying the warning.

5. The monitoring method according to claim 3, wherein the outputting includes transmitting the warning to the radio frequency identification tag via the tag reader.

6. The monitoring method according to claim 1, further comprising controlling a lock mechanism corresponding to a door so as to shut the door based on information about a position of the door and the area information, when it is determined that the person carrying the radio frequency identification tag is not allowed to enter the predetermined area.

7. The monitoring method according to claim 1, further comprising:
    controlling a camera that monitors the predetermined area, based on information about a position of the camera and the area information, when it is determined that the person carrying the radio frequency identification tag is not allowed to enter the predetermined area; and
    recording a video with the camera.

8. A monitoring method comprising:
    acquiring tag identification information that is unique to a radio frequency identification tag carried by a person, and reader identification information that is unique to a tag reader capable of detecting the radio frequency identification tag in a predetermined area;
    recording positional history that indicates a position of the radio frequency identification tag at a certain time based on timing at which the tag identification information and the reader identification information are acquired;
    recording a video of the predetermined area and time at which the video is recorded;
    calculating the number of tag identification information detected by a predetermined tag reader based on the positional history;
    calculating the number of persons in the predetermined area based on the video; and
    determining whether the number of the tag identification information is equal to the number of persons.

9. The monitoring method according to claim 8, further comprising outputting a warning when it is determined that the number of the tag identification information is not equal to the number of persons.

10. The monitoring method according to claim 9, wherein the outputting includes displaying the warning.

11. A monitoring method comprising:
    acquiring tag identification information that is unique to a radio frequency identification tag carried by a person, and reader identification information that is unique to a tag reader capable of detecting the radio frequency identification tag in a predetermined area;
    recording positional history that indicates position of the radio frequency identification tag at a certain time based on timing at which the tag identification information and the reader identification information are acquired;
    detecting with a human detector whether a person is present in a predetermined area corresponding to a predetermined tag reader;
    acquiring the tag identification information detected by the predetermined tag reader based on the positional history; and
    determining whether the detection by the human detector and the tag identification information satisfy a predetermined relationship or not.

12. The monitoring method according to claim 11, further comprising outputting a warning when it is determined that the detection by the human detector and the tag identification information do not satisfy the predetermined relationship.

13. The monitoring method according to claim 12, wherein the outputting includes displaying the warning.

14. A monitoring method comprising:

acquiring tag identification information that is unique to a radio frequency identification tag carried by a person, and reader identification information that is unique to a tag reader capable of detecting the radio frequency identification tag in a predetermined detection area;

recording positional history that indicates a position of the radio frequency identification tag at a certain time based on timing at which the tag identification information and the reader identification information are acquired;

preparing a pattern of the positional history for each of the tag identification information based on the positional history; and identifying and recording abnormality pattern about at least an existence time of the radio frequency identification in the predetermined detection area or a number of the predetermined detection area where the radio frequency identification exists; determining that a suspicious person exists in the predetermined detection area when at least a portion of the prepared pattern matches with any one of the already recorded abnormality patterns.

15. The monitoring method according to claim 14, further comprising outputting a warning when it is determined that at least a portion of the pattern prepared matches with any one of already recorded patterns.

16. The monitoring method according to claim 15, wherein the outputting includes displaying the warning.

17. A computer program product including computer executable instructions, wherein the instructions, when executed by the computer, cause the computer to perform:
acquiring tag identification information that is unique to a radio frequency identification tag carried by a person, and reader identification information that is unique to a tag reader capable of detecting the radio frequency identification tag in a predetermined area;

recording positional history that indicates position of the radio frequency identification tag at a certain time based on timing at which the tag identification information and the reader identification information are acquired, acquiring a set of the tag identification information and the reader identification information corresponding to a predetermined time based on the positional history, wherein the acquiring of the tag identification information and the reader identification information is performed at the acquiring based on the set of the tag identification information and the reader identification information;

acquiring attribute information that is information about the person carrying the radio frequency identification tag based on the tag identification information acquired;

acquiring area information that is information about the predetermined area based on the reader identification information; and determining whether the person carrying the radio frequency identification tag is allowed to enter the predetermined area based on the attribute information and the area information.

18. A computer program product including computer executable instructions, wherein the instructions, when executed by the computer, cause the computer to perform:
acquiring tag identification information that is unique to a radio frequency identification tag carried by a person, and reader identification information that is unique to a tag reader capable of detecting the radio frequency identification tag in a predetermined area;

recording positional history that indicates a position of the radio frequency identification tag at a certain time based on timing at which the tag identification information and the reader identification information are acquired;

recording a video of the predetermined area and time at which the video is recorded;

calculating the number of tag identification information detected by a predetermined tag reader based on the positional history;

calculating the number of persons in the predetermined area based on the video; and determining whether the number of the tag identification information is equal to the number of persons.

19. A computer program product including computer executable instructions, wherein the instructions, when executed by the computer, cause the computer to perform:
acquiring tag identification information that is unique to a radio frequency identification tag carried by a person, and reader identification information that is unique to a tag reader capable of detecting the radio frequency identification tag in a predetermined area;

recording positional history that indicates position the radio frequency identification tag at a certain time of based on timing at which the tag identification information and the reader identification information are acquired;

detecting with a human detector whether a person is present in a predetermined area corresponding to a predetermined tag reader;

acquiring the tag identification information detected by the predetermined tag reader based on the positional history; and determining whether the detection by the human detector and the tag identification information satisfy a predetermined relationship or not.

20. A computer program product including computer executable instructions, wherein the instructions, when executed by the computer, cause the computer to perform:
acquiring tag identification information that is unique to a radio frequency identification tag carried by a person, and reader identification information that is unique to a tag reader capable of detecting the radio frequency identification tag in a predetermined detection area;

recording positional history that indicates a position of the radio frequency identification tag at a certain time based on timing at which the tag identification information and the reader identification information are acquired;

preparing a pattern of the positional history for each of the tag identification information based on the positional history; and identifying and recording abnormality pattern about at least an existence time of the radio frequency identification in the predetermined detection area or a number of the predetermined detection area where the radio frequency identification exists; determining that a suspicious person exists in the predetermined detection area when at least a portion of the prepared pattern matches with any one of the already recorded abnormality patterns.

* * * * *